US012102597B2

(12) United States Patent
Schuldt-Lieb et al.

(10) Patent No.: US 12,102,597 B2
(45) Date of Patent: Oct. 1, 2024

(54) TRANSFER DEVICE

(71) Applicant: MEDAC GESELLSCHAFT FÜR KLINISCHE SPEZIALPRÄPARATE MBH, Wedel (DE)

(72) Inventors: Sonja Schuldt-Lieb, Hamburg (DE); Friedrich Pipelka, Klosterneuberg (AT)

(73) Assignee: MEDAC GESELLSCHAFT FÜR KLINISCHE SPEZIALPRÄPARATE MBH, Wedel (DE)

( * ) Notice: Subject to any disclaimer, the term of this patent is extended or adjusted under 35 U.S.C. 154(b) by 742 days.

(21) Appl. No.: 16/895,323

(22) Filed: Jun. 8, 2020

(65) Prior Publication Data

US 2020/0297582 A1 Sep. 24, 2020

Related U.S. Application Data

(62) Division of application No. 15/125,687, filed as application No. PCT/EP2015/055922 on Mar. 20, 2015, now Pat. No. 10,716,736.

(30) Foreign Application Priority Data

Mar. 27, 2014 (DE) ..................... 10 2014 104 281.6

(51) Int. Cl.
*A61J 1/14* (2023.01)
*A61J 1/16* (2023.01)
*A61J 1/20* (2006.01)

(52) U.S. Cl.
CPC ........... *A61J 1/2089* (2013.01); *A61J 1/1406* (2013.01); *A61J 1/16* (2013.01); *A61J 1/201* (2015.05);

(Continued)

(58) Field of Classification Search
CPC .. A61J 1/1406; A61J 1/16; A61J 1/201; A61J 1/2013; A61J 1/2051; A61J 1/2055; A61J 1/2065; A61J 1/2089
See application file for complete search history.

(56) References Cited

U.S. PATENT DOCUMENTS 4,576,211 A 3/1986 Valentini et al.
4,936,841 A 6/1990 Aoki et al.
(Continued)

FOREIGN PATENT DOCUMENTS

DE 698 08 432 T2 12/2003
DE 10 2005 006 771 A1 8/2006
(Continued)

OTHER PUBLICATIONS

Non-English International Search Report dated Sep. 21, 2015 for Application No. PCT/EP2015/055922 with English translation.
(Continued)

*Primary Examiner* — Kai H Weng
(74) *Attorney, Agent, or Firm* — LADAS & PARRY LLP; Malcolm J. MacDonald

(57) ABSTRACT

A transfer device (10) for removing or transferring a medium out of or into a bottle (20) having a bottle neck (34) that can be closed by means of a closure (42), including a first adapter part (12), which can be positioned on the bottle, and a second adapter part (14), which interacts with the first adapter part, which can be displaced in the longitudinal direction of the bottle, and has a conducting element (50) for piercing the closure. After the second adapter part (14) has been displaced along the first adapter part in the direction of the closure (42) and the second adapter part has been locked, the first adapter part (12) is non-releasably fastened to or around the bottle (20).

20 Claims, 34 Drawing Sheets

(B-B)

Figure 1:
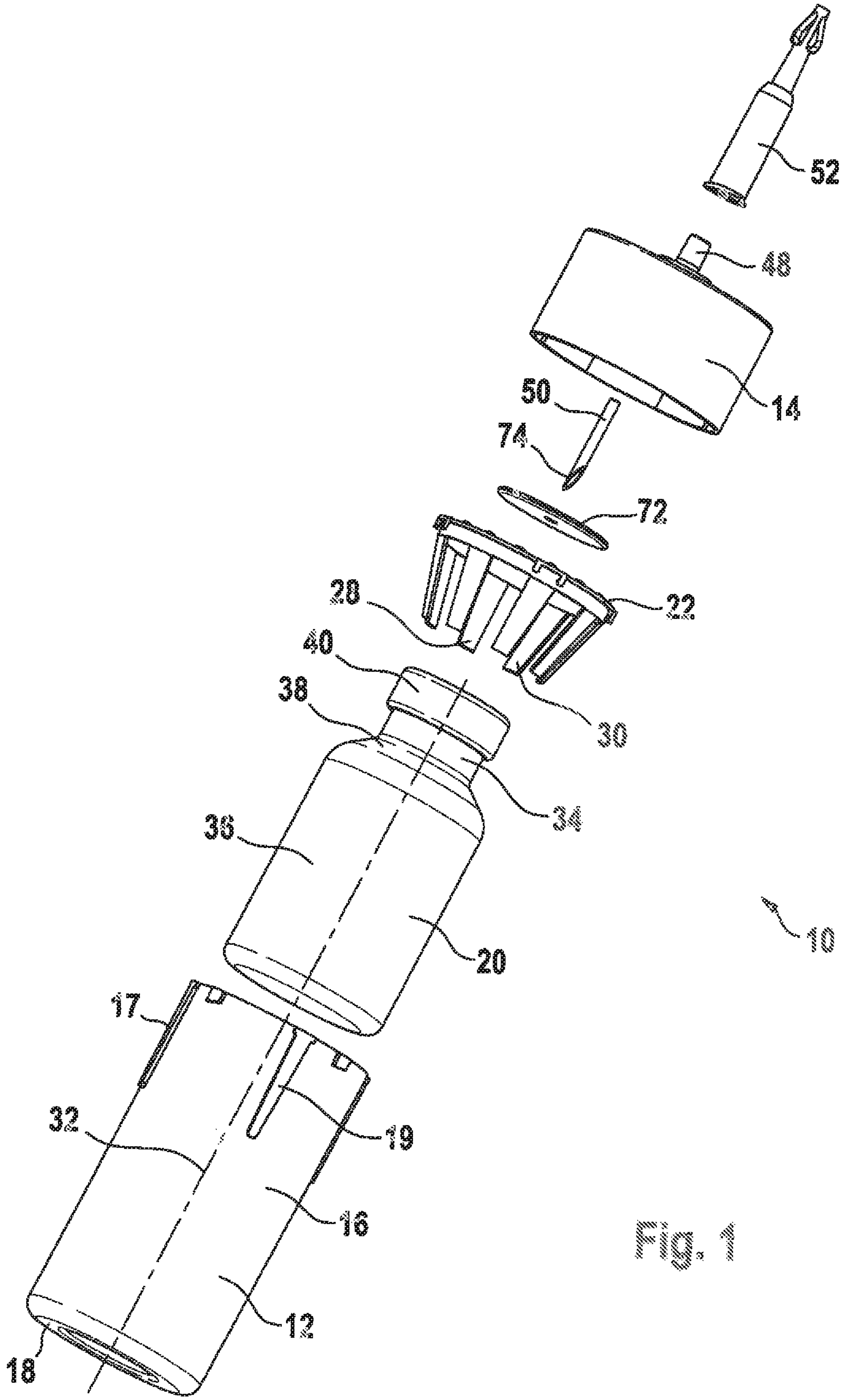

(52) U.S. Cl.
CPC .......... *A61J 1/2051* (2015.05); *A61J 1/2055* (2015.05); *A61J 1/2065* (2015.05); *A61J 1/2013* (2015.05)

(56) References Cited

U.S. PATENT DOCUMENTS

| | | | | |
|---|---|---|---|---|
| 5,061,264 | A | 10/1991 | Scarrow | |
| 5,364,386 | A | 11/1994 | Fukuoka et al. | |
| 5,503,302 | A | 4/1996 | DeJonge | |
| 5,893,397 | A * | 4/1999 | Peterson | A61J 1/2096 141/378 |
| 6,478,788 | B1 | 11/2002 | Aneas | |
| 6,537,263 | B1 | 3/2003 | Aneas | |
| 8,562,582 | B2 | 10/2013 | Tuckwell et al. | |
| 9,345,641 | B2 | 5/2016 | Kraus et al. | |
| 10,058,482 | B2 | 8/2018 | Haindl et al. | |
| 2009/0036861 | A1 * | 2/2009 | Moy | A61J 1/1475 604/403 |
| 2011/0218511 | A1 | 9/2011 | Yokoyama | |
| 2012/0296307 | A1 * | 11/2012 | Holt | A61J 1/2051 604/407 |
| 2013/0199669 | A1 | 8/2013 | Moy et al. | |

FOREIGN PATENT DOCUMENTS

| | | | |
|---|---|---|---|
| EP | 0311 787 | A2 | 4/1989 |
| EP | 0 335 378 | A2 | 10/1989 |
| EP | 0 614 653 | A2 | 9/1994 |
| EP | 1 430 864 | | 11/2010 |
| JP | 52-151288 | | 12/1977 |
| JP | 01-135354 | | 5/1989 |
| JP | 04-132554 | | 5/1992 |
| JP | 05-317386 | | 12/1993 |
| JP | 10-192364 | | 7/1998 |
| JP | 2010535069 | A1 | 11/2010 |
| WO | 98/32411 | A1 | 7/1998 |
| WO | 2007/101798 | A2 | 9/2007 |
| WO | 2007140238 | A2 | 12/2007 |
| WO | 2009/029390 | A1 | 3/2009 |
| WO | 2011140596 | A1 | 11/2011 |
| WO | 2014003614 | A1 | 1/2014 |

OTHER PUBLICATIONS

Espacenet English abstract of DE 10 2005 006 771 A1.

European Search Report, dated Sep. 8, 2021, corresponding to EP Application 21 17 6118.

Non-English Japanese Office Action, dated Sep. 7, 2021, for JP Application No. 2021-030275.

Japanese Office Action and Search Report, dated Jan. 8, 2019, for JP Application No. 2017-501482.

Canadian Office Action, dated Nov. 23, 2018, for Application No. 2,948,042.

Non-English European Office Action, dated Dec. 4, 2018, for Application No. 15 712 326.6.

International Search Report, dated Sep. 21, 2015, corresponding to International Application No. PCT/EP2015/055922.

Non-English European Office Action, dated Aug. 20, 2020, for EP Application No. 15 712 326.6.

* cited by examiner (C-C)

(D-D)

(E-E)

(F-F)

(A-A)

(B-B)

(C-C)

(D-D)

(E-E)

(F-F)

(G-G)

(H-H)

(A-A)

(A-A)

(B-B)

(C-C)

(D-D)

(E-E)

(F-F)

(G-G)

(A-A)

(B)

(C-C)

(D-D)

(E-E)

(F-F)

(G-G)

(H-H)

TRANSFER DEVICE

This application is a divisional of application Ser. No. 15/125,687, filed Sept. 13, 2016, which is a 371 of PCT/EP2015/055,922, filed on Mar. 20, 2015, which claims priority to German patent application number 10 2014 104 281.6, filed Mar. 27, 2014, the contents of which are incorporated herein by reference.

The invention relates to a transfer device for the withdrawal or delivery of a medium out of or into a bottle with a neck, which is sealable by a closure, comprising a first adapter component that can be positioned at the bottle, and a second adapter component, which interacts with the first adapter component, is moveable along the longitudinal direction of the bottle, with a needle as puncture needle, cannula, spike, or perforation device, for piercing the closure.

Many medicinal products for infusion, injection, or instillation are supplied as dry substances to be blended only briefly before administration with water or another solvent to form a solution or suspension. Other liquid preparations must be diluted prior to use.

In this, the dry substance is generally supplied in an injection bottle, a so-called vial. Primarily liquid medical agents are also offered in vials. In order to connect this bottle to another container or an infusion device, one may use a connector (transfer device), into which the head of the vial is pushed and the membrane of the vial is perforated. In this, the other container can be, for example, another injection bottle, an infusion bag, a solvent bag, or a syringe.

According to the state of technology, these connectors, which are also referred to as adapters and are composed of adapter components, can possess a steel cannula or a plastic dome in their centre, which is surrounded by a collar that forms a hollow-cylindrical body, which snaps onto the flange-like edge of the vial, in particular an aluminum crimped lid. From the bottom wall of the collar originates the puncture needle, in particular in form of a steel cannula, and extends along the longitudinal direction of the hollow-cylindrical body.

For several reasons, adapters of this type no longer meet today's requirements for vial adapters.

According to regulations such as the *Technische Regeln für Gefahrstoffe*(Technical Regulations for Hazardous Materials) (TRGS 525) of the *Bundesanstalt für Arbeitsschutz und Arbeitsmedizin und Zytostatika im Gesundheitsdienst* (M620) published by the *Berufsgenossenschaft für Gesundheitsdienst und Wohlfahrtspflege*, a release of hazardous material such as for example medical agents is to be prevented or to be reduced. This particularly applies to the preparation of hazardous or medical substances.

Such a release leads to exposition of personnel, patients, and the environment. This facilitates an intake of the release substances via inhalation, skin absorption, or oral means. The release itself can for example take place via the formation of aerosols, splashes during preparation, leakage of the adapter during disconnection of the adapter, or possibly as a result of glass breakage, as well as after injury from a contaminated cannula.

On the one hand, the vial adapters known in the state of technology in principle do not offer aerosol or leak-proofness.

On the other hand, no protection against injury from contaminated needles, as required by Accident Prevention Regulation TRBA 25, is provided. Also, an exposition during the removal of the adapter is not being prevented.

The second reason is that the seal must be pierced by the puncture needle in its centre to ensure a leak-tight connection of the vial. When using state of technology vial adapters one risks tilting the vial when snapping it into the collar. This results in a primarily eccentric puncture of the seal. When subsequently the vial is pushed in completely, the cannula is forced into a centric position. This results in tension stress on the seal of the vial, which can result in leakages next to the cannula. If toxic substances are employed, such as for example cytostatic agents, then this can present a hazard for personnel and patients.

Irrespective hereof, the relevant adapters generally do not offer any aerosol or leak-proofness.

A transfer device in accordance with EP 1 430 864 B1 consists of a cap-like outer guide component and a tubular inner guide component, which are moveable relative to each other in a telescoping manner. In the unused state, the origins of the inner guiding component snap into recesses extending inside the outer guiding component. When the transfer device is pushed onto a vial, tongue-like elements originating from the inner guiding component are bent outward with the result that the outer guiding component is adjusted outward in the area of the recesses, so that the interlocking between the inner and the outer guiding components is released. Another disadvantage is that the transfer device can easily be pulled off the vial after use, which again creates the risk of injury for the user.

Known from DE 10 2005 006 771 A1 is a transfer device that comprises a needle holder with transfer needle, which are axially adjustable in a hollow-cylindrical structure. The structure contains a wall-like limit stop, which can be fit onto the opening of a storage container that is to be pierced and during operation of the transfer device is pierced by the transfer needle.

A transfer device in accordance with DE 698 08 432 T2 comprises an actuator, to be able to use rotation to axially adjust a first component that comprises a dome relative to a second component that encloses the closure of a bottle.

DE 10 2005 006 771 A1 discloses a fluid transfer device that comprises a sleeve-like guide structure which surrounds a needle holder with puncture needle. The sleeve-like guide structure of one embodiment example comprises axially extending and moveable sleeve strips, which comprise clamping elements for engaging a collar-like rim of a vial.

A transfer device in accordance with WO 2009/029390 A1 comprises an inner and an outer adapter component, which are joined in the flange-like edge region by ultrasonic welding. The transfer device surrounds a vial, which in turn is surrounded by an enveloping structure relative to which the transfer device engages.

These designs also have the disadvantage that after use of the transfer device the vials can very easily be detached.

Moreover, the separability of vial and connector also results in the disadvantageous risk of contamination, for example by inhalation, skin absorption, or the formation of aerosols during the removal of the needle from the vial.

One of the objectives of the present invention is to provide a transfer device, i.e. a vial connector or vial adapter, that offers increased exposure safety.

According to a further aspect it is to be ensured that an aerosol-proofness is possibly already given when the vial, i.e. the bottle, is being pierced.

One aspect aims to prevent any leakage after penetration of the closure that would result in a hazard.

A further aspect to be emphasized is that since the adapter remains at the vial or around the vial, aerosols that are generated in the separation process can not escape. Moreover, the adapter should be seal-tight for aerosols already during its use.

Another aspect of the invention is to ensure that any injury by way of the delivery element such as needle, cannula, spike, or penetration device is ruled out after the use of the transfer device.

To provide solutions of one or several aspects, the invention intends that the first adapter component, after the second adapter component has been moved along the first adapter component in the direction of the closure and the two adapter components have been interlocked, is inseparably fixed in position at the bottle or around the bottle.

Originating from the first adapter component for this purpose may in particular be radially adjustable position-securing elements, by which the first adapter component, after the second adapter component has been moved along the first adapter component in the direction of the closure and has been locked in place, is inseparably fixed in position on/at the bottle during proper use of the transfer device.

The invention is in particular characterized in that the first and the second adapter component surround the bottle in such a manner that a closed envelope is formed, so that both leak-proofness for aerosol and leakage safety are provided. For this purpose, in particular the first adapter component, which accommodates the bottle body, is embodied with a cup-shaped geometry. The second adapter component, from which originates the delivery element, also possesses a hood- or cup-shaped geometry and can be interlocked with the first adapter component. In addition, a sealing element may originate from the second adapter component to seal the first and the second adapter components with respect to the bottle.

The invention makes available a transfer device, which after its use, i.e. after penetration of the closure seal, can no longer be detached from the bottle, which hereinafter predominantly is referred to as vial. In this regard, it can be intended that prior to the use of the transfer device, an inadvertent touching of the tip of the delivery element is ruled out to prevent any risk of injury.

With respect to the delivery element it should be noted that it may for example be a needle, a cannula, a spike or another type of perforation device. In this respect the invention is not restricted. Rather, the term delivery element should encompass every suitable element that facilitates a medium transfer. For this reason, various terms are employed here, in particular puncture needle or cannula, without this restricting the scope of the invention's teaching.

The invention in particular is characterized by the first adapter component comprising a casing section, also referred to as a casing wall, which has a hollow-cylindrical geometry, possesses a front edge extending on the bottle closure side, and which surrounds the bottle along its circumference, a bottom section that at least partially, preferably completely covers the bottom of the bottle, as well a holding section extending on the front edge side, from which originate the position-securing elements, which may be embodied tongue-like or ledge-like, and which are tiltable, bendable, or spreadable in the radial direction of the first adapter component, and which extend in the direction of the longitudinal axis of the first adapter component.

Consequently, after the vial has been introduced into the first adapter component, the position-securing elements can be braced against the transition between the neck and the body of the bottle, as a result of which the first adapter component no longer is detachable from the vial.

Preferably it is intended that the holding section is embodied as an annular section that extends in the front end region of the casing section that for example can be fastened, such as clamped or glued to the edge of the casing wall, extends at least in sections along the inside of the casing section, and comprises deformable first projections that extend beyond the front edge along the axial direction. These projections create the option of locking the first and the second adapter components to each other. For this purpose, in an alternative design, second projections originate from the outside of the casing wall and, when the adapter components are interlocked, are latchable or lockable in guides, guide slots, of the second adapter component. Subsequently, the second projections are no longer removable from the guides during normal handling of the transfer device.

As a further development the invention proposes that the second adapter component comprises an outer hollow-cylindrical section and a boundary wall, which extends across the longitudinal axis of that section, and from which originates the puncture needle, i.e. the delivery element, or through which passes the puncture needle.

Every guide is intended for one projection and comprises a first section, which originates from the free front edge of the outer cylinder section, extends in the latter's longitudinal direction, merges with a second section, which extends obliquely to the first section on the boundary wall side, and in which the second projection guided therein can be fixed in position, i.e. locked, and which protrudes radially from the outside of the casing wall of the holding section of the first adapter component.

In particular it is intended that the second section of the guide possesses a reduction in cross section along the axial direction, with an axial extent that is smaller than the axial extent of the maximum distance between the first and the second projection. In front of and behind the reduction in axial cross section, the axial extent between the boundary wall and the averted edge of the second section of the guide should be at least equal to the maximum distance between distantly-situated sections of the first and the second projections in the axial direction. Consequently the second adapter component must at first be guided in the axial direction, i.e. in the longitudinal direction of the vial in the first section of the guidance, i.e. moved in the direction of the first adapter component, so that a subsequent rotation can insert the second projections into the end section of the second section of the guide that is bordered by the reduction in cross-section, where they are secured in position, which results in an inseparability between the first and the second adapter component.

In this, at least the limit of the second section of the guide—which faces away from the boundary wall, i.e. extends on the bottle side, and forms the inner edge—should in the direction of the boundary wall at least in sections extend inclined relative to the longitudinal axis of the first adapter component and thus of the transfer device, and enclose with the longitudinal axis an obtuse angle.

In order to facilitate a tilt-free guidance of the first adapter component relative to the second adapter component, one proposal of the invention intends that the interior cross section of the hollow-cylindrical section of the second adapter component corresponds to the exterior cross section of the mantel section of the first adapter component.

A secure guidance is also guaranteed by the overlap of the adapter components, or by the previously explained axially extending guides, such as guide slots, or by for example longitudinal ribs, which originate from one of the adapter components, or from a sealing element connected with the adapter component, in particular from the second adapter component.

As a further development of the invention it is intended that coaxially to the outer hollow-cylindrical section of the second adapter component extends an inner hollow-cylindrical section, whereby preferably the protective element referred to as first protective element is in particular slidingly arranged, whereby when there is no connection between the first adapter component with the second adapter component, the tip of the puncture needle extends between the protective element and the boundary wall of the outer hollow-cylindrical section. This measure ensures that injuries from the puncture needle are ruled out when the first adapter component is not connected to the second adapter component.

To facilitate secure fastening, i.e. to ensure inseparability between the adapter components, the invention further intends that the second projection, projected onto the outside of the casing section, possesses a rectangular or trapezoidal geometry, with one corner, which, when the first and the second adapter components have been fixed in their relative positions, interacts with a step that effects a reduction in cross section of the second section of the guide, to prevent a detachment.

In a further embodiment of a transfer device according to the invention, which after piercing the seal is no longer detachable from the vial, it is intended that the first adapter component of the transfer device comprises a first outer hollow-cylindrical section extending on the bottle side, and originating from the latter section, a first inner hollow-cylindrical section of a smaller cross section, that the first outer hollow-cylindrical section comprises axially extending tongue-shaped sections that form the position-securing elements, with radially inward protruding projections in their respect free end regions for gripping a section of the bottle, in particular its collar-like rim, and that the second adapter component comprises a second outer hollow-cylindrical section that is moveable along the outside of the first outer hollow-cylindrical section of the first adapter component, that when the second outer hollow-cylindrical section surrounds the first outer hollow-cylindrical section of the first adapter component, an outwardly directed radial adjustment of the tongue-shaped sections is prevented or largely prevented, and that from the second outer hollow-cylindrical section of the second adapter component originates a third outer hollow-cylindrical section of smaller cross-section, within which a second inner hollow-cylindrical section, from which originates the puncture needle, is moveable as the second part of the second adapter component.

The invention presents a transfer device that consists of the first adapter component, which holds in place a bottle or rather its neck, and a second adapter component that consists of two parts, which are axially moveable relative to each other and relative to the first adapter component. In this, the effect of the outer part of the second adapter component is that when the hollow-cylindrical section of greater cross section covers the first outer hollow-cylindrical section of the first adapter component over a set axial length, the tongue-shaped sections that in particular engage behind the collar-like rim of the bottle can no longer be adjusted outward, so that a detachment from the bottle is ruled out. Simultaneously the adapter components interlock to prevent a retraction of the second adapter component.

In particular it is intended that the outer part of the second adapter component interlocks with the first adapter component. Preferably a projection such as a rib protruding radially inward from the second outer hollow-cylindrical section of the second adapter component interacts with a recess, or step, or geometrical modification with the same effect, of the first hollow-cylindrical section of the first adapter component in such a way that an axial movement of the second adapter component relative to the first adapter component against the penetration direction is prevented.

As a further development of the invention it is suggested that an axial adjustment of the second adapter component relative to the first adapter component is prevented by a first removable safety and that an axial adjustment of the second inner section relative to the third outer section of the second adapter component is prevented by a second removable safety.

Consequently, when the safeties are in place, seen along the axial direction, the first and the second adapter components form a rigid unit. When the first safety is removed after the transfer device has been pushed onto a vial, the second adapter component can be moved as a subunit in the penetration direction, which as a result produces the desired relative locking between the first and the second adapter component, which in turn has the result that the tongue-shaped position-securing elements, which comprise the radially inwardly protruding projections, can no longer be adjusted outwardly, so that a detachment from the bottle is ruled out.

However, when the first safety is removed and the second safety is still in place, the penetration needle is not adjustable relative to the outer part of the second component. Once the transfer device is set in position on the bottle by adjusting the second adapter component, i.e. after removing the first safety, the second safety is removed, so that the second inner section now can be shifted axially towards the bottle relative to the outer part of the second adapter component, which comprises the second and third outer hollow-cylindrical sections, so that the cannula originating from the inner part of the second adapter component can pierce the closure.

In order to rule out the risk of injury from the penetration tip when the transfer device is not connected to a bottle, a further development intends that from the first inner section of the first adapter component originates a protective element that is referred to as second protective element, between which and the second inner section of the second adapter component extends the tip of the penetration needle when the transfer device is not in use.

The geometries of the adapter components and their sections should be such that during an axial movement of the second adapter component relative to the first adapter component, the third outer section of the second adapter component is guided along the outside, whereas the second inner section is guided along the inside of the first inner section of the first adapter component.

In particular, the first safety should possess the geometry of an annular section, which when the transfer device is not in use passes through a slot present in the third outer section of the second adapter component and engages in a recess such as groove that is aligned with that slot in the outer wall of the first inner section of the first adapter component.

Preferably it is intended that the second inner section of the second adapter component on the side facing the puncture needle tip comprises a bottom wall through which the puncture needle passes and on the side facing away from the puncture needle tip comprises a preferably circumferential flange section that is facing radially outward and originates from the adapter component's circumferential wall, in particular from the outer front region of the second section of the second adapter component, and possesses an effective radial extent that is at least equal, but preferably greater than the outer cross section of the third outer section of the second adapter component. This flanged section serves as a handle to facilitate axial shifting of the second adapter component relative to the first adapter component, or of the inner section of the second adapter component relative to the latter's outer section.

It is further intended that the second safety can also possess the geometry of a second annular section, which, when the first adapter component is non-displaceable relative to the second adapter component, is retained in position between the free front edge of the third outer section and the flanged section of the second inner section of the second adapter component.

As a further development it is intended that the first and/or second the protective element, which protect against inadvertent touching of the puncture needle tip when the transfer device is not in use, is a disk element, whereby the first, and preferably also the second protective element, are arranged axially adjustable in the first or second adapter component.

Moreover, undercuts or snap connections can be employed to ensure that when the first and the second adapter component have been assembled, these are not separable during regular use, even when they have not been secured in position on a bottle yet. These measures serve to form a closed system. Injuries by the puncture needle are ruled out.

A further development of the invention intends that when in the operation position of the transfer device the second outer hollow-cylindrical section of the second adapter component is interlocked with the first outer hollow-cylindrical section of the first adapter component, an intermediate wall extending between the second and the third outer hollow-cylindrical sections of the second adapter component is in contact with an intermediate wall extending between the first outer hollow-cylindrical section and the first inner hollow-cylindrical section of the first adapter component.

In order to be able to axially shift the second adapter component for locking in place the first adapter component, after the latter surrounds to the necessary degree the bottle, i.e. in particular the collar-like rim originating from the bottle neck, the second safety element remains between the third outer section and the second inner section of the second adapter component.

In a further development of the invention it is intended that when the second safety element is present between the third outer section and the second inner section of the second adapter component, the third outer section and the second inner section are locked in place in such a manner that an axial adjustment against the penetration direction of the penetration needle is prevented.

Irrespective hereof, the invention demonstrates novelty and inventiveness in that during movement of the second part in the penetration direction of the puncture needle, the second adapter component interacts with the first adapter component in such a manner that a movement of the second adapter component relative to the first adapter component against the penetration direction is prevented.

Novel and inventive is also the feature that the first and the second adapter component are embodied in such a manner that when they surround the bottle they form a closed container, which rules out the escape of aerosol or, after piercing of the seal, the escape of the medium present in the bottle, to the surroundings, so that any contamination, e.g. through aspiration or skin contact, or possibly orally, is prevented. In this, also a novel and inventive feature, the element that comprises the delivery element may also comprise a sealing element, which serves to seal the second adapter component with respect to the bottle, in particular both with respect to the bottle and the first adapter component.

In other words, the invention is also distinguished by a transfer device for withdrawal or delivery of a medium from or into a bottle with a neck, which is sealable by a closure, comprising a first adapter component that can be positioned at the bottle, and, interacting with the first adapter component and moveable in the longitudinal direction of the bottle, a second adapter component with a delivery element for piercing the seal, whereby when the first and the second adapter components have been telescoped together, they form a closed container that envelopes the bottle. In this, the second adapter component preferably comprises a sealing element that provides a seal of the second adapter component relative to the bottle and/or relative to the first adapter component. Preferably also provided is an inseparability of the adapter components.

As a further development of the invention it is intended that the inseparability of the adapter components is achieved via projections that engage in recesses, which only can be shifted relative to each other in the penetration direction of the delivery element, e.g. cannula, and can not be separated in the reverse direction. This interlocking can be accomplished via tongue-like elements, which comprise latching hooks, which in turn interact with corresponding elements. The tongue-like elements may possess different lengths. The invention also encompasses sealing elements that prevent the escape of liquids, dust, aerosols, or similar from an enclosed space. In this, the sealing elements can seal the adapter components against each other or within themselves. A possible configuration includes sealing elements that comprise recesses, depressions, projections, which can be circumferential or annular, or similar elements to seal the space relative to the surroundings. The sealing elements can be situated between the outer parts of the adapters, or between the inner parts, or the inner and outer parts of the adapters. It is also possible for the sealing elements to provide a seal directly against the bottle.

The sealing elements can also be embodied with guidance grooves so that the telescoping movement of the adapter components or the movement of bottles into the adapter components is made easier.

Further configurations are contained in the claims.

One of the advantages provided by the invention's teaching is that a seal-tightness for aerosols is already provided at the time when the vial, i.e. the bottle, is pierced.

The invention also makes it possible to prevent any hazardous leakages after the seal has been pierced.

Since the adapter remains on the vial or around the vial, no aerosols can develop during a detaching process. In addition, leak-proofness for aerosols is provided during use.

A further advantage of the invention that is to be emphasized is that injuries after the use of the transfer device caused by the delivery element such as needle, cannula, spike, or perforation device are ruled out.

A subject matter of the invention is also a kit, consisting of a container with a medical agent, a bag with solvent to dissolve the medical agent, as well as a transfer device for mixing the solvent with the medical agent.

Further details, advantages, or features of the invention are not only found in the claims, the characteristic features disclosed therein, individually and/or in combination, but also in the following description of preferred embodiment examples shown in the figures.

Figure 2:
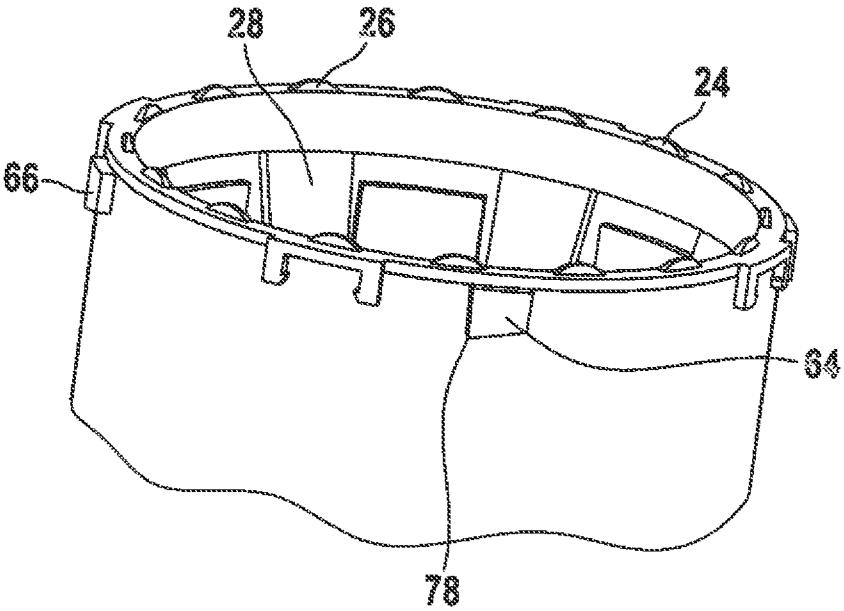
Figure 3:
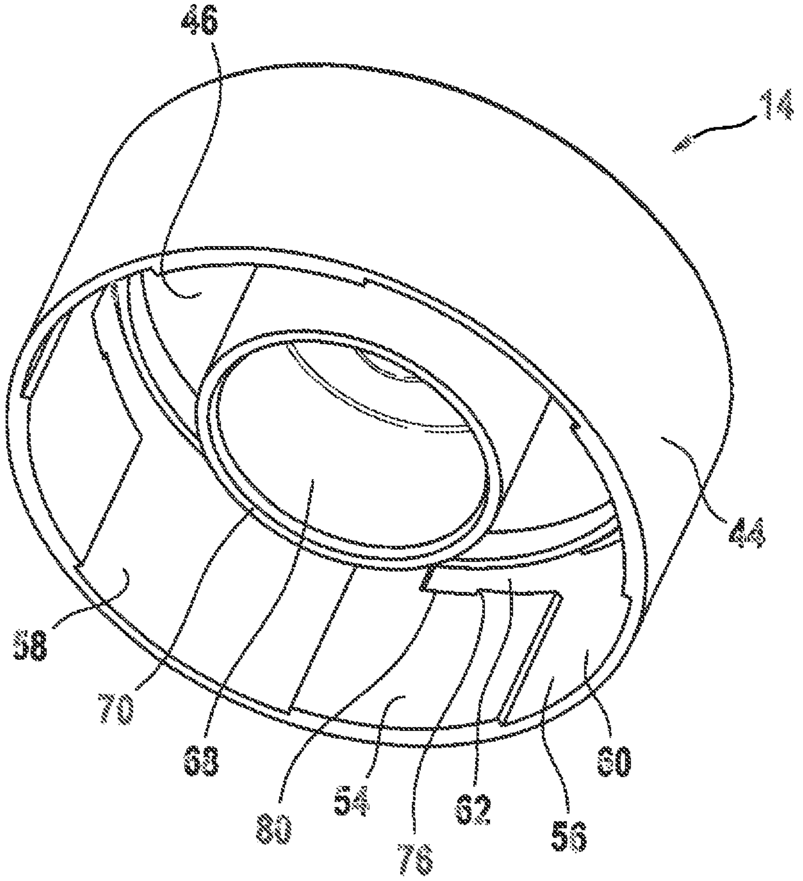
Figure 4A:
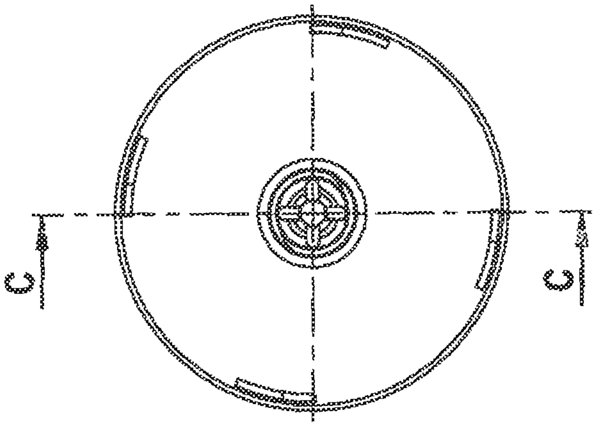
Figure 4B:
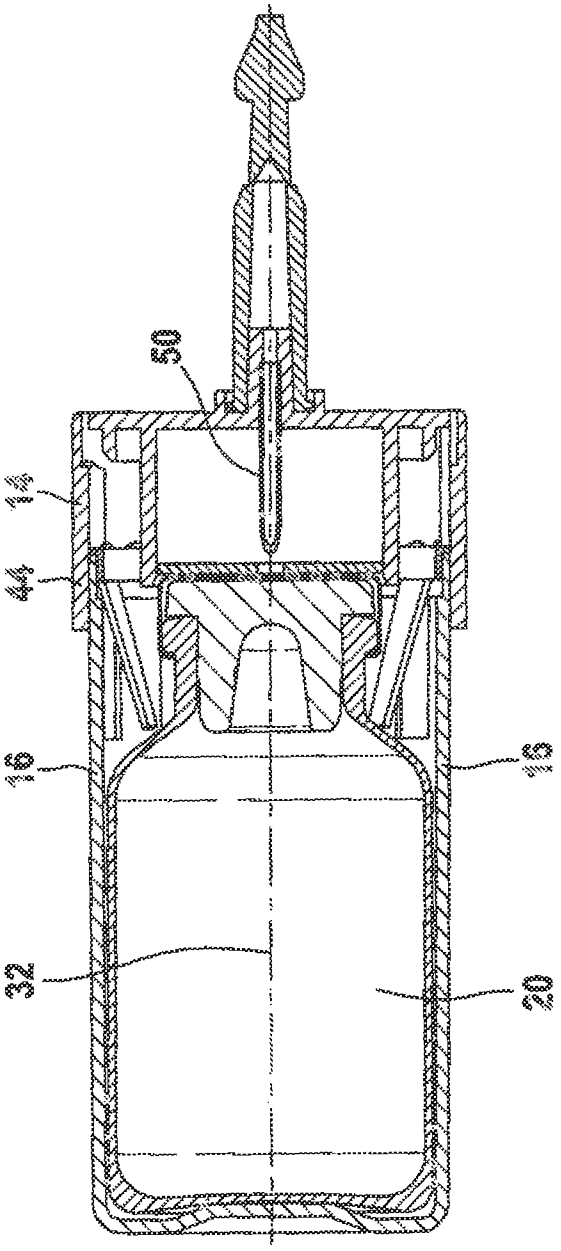
Figure 5A:
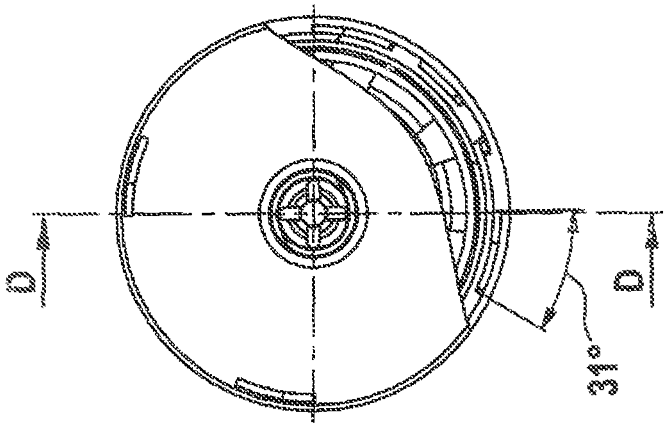
Figure 5B:
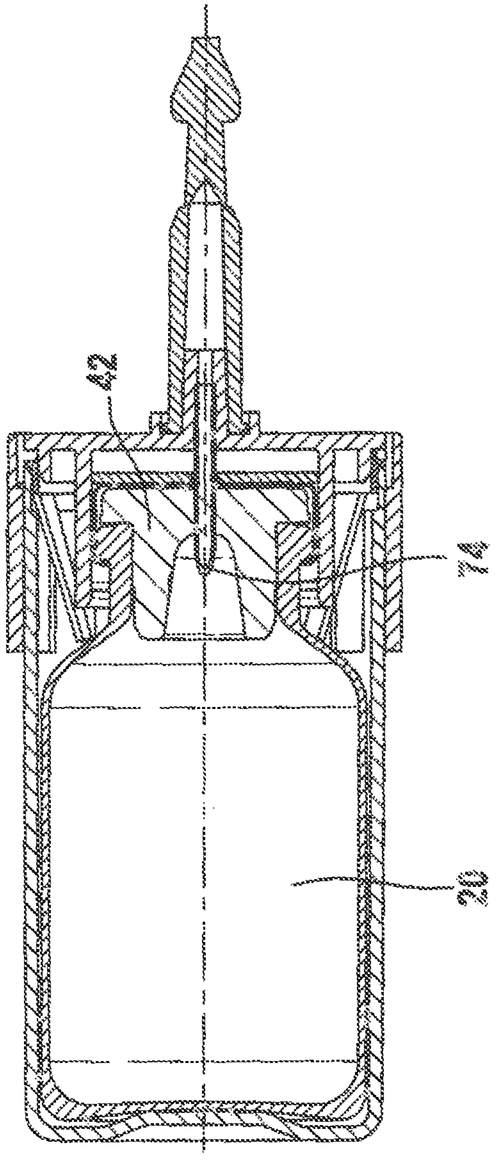
Figure 6A:
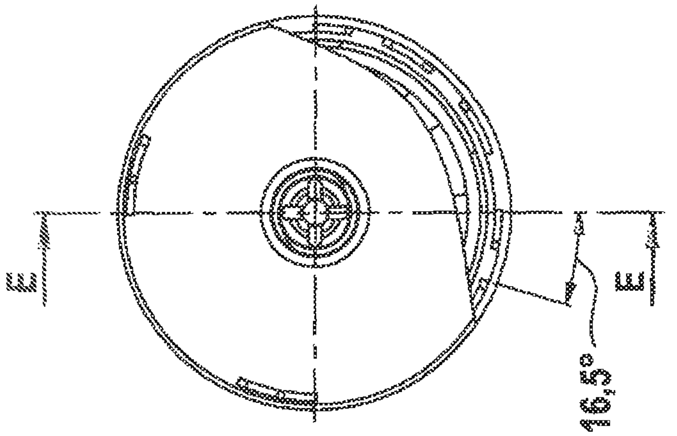
Figure 6B:
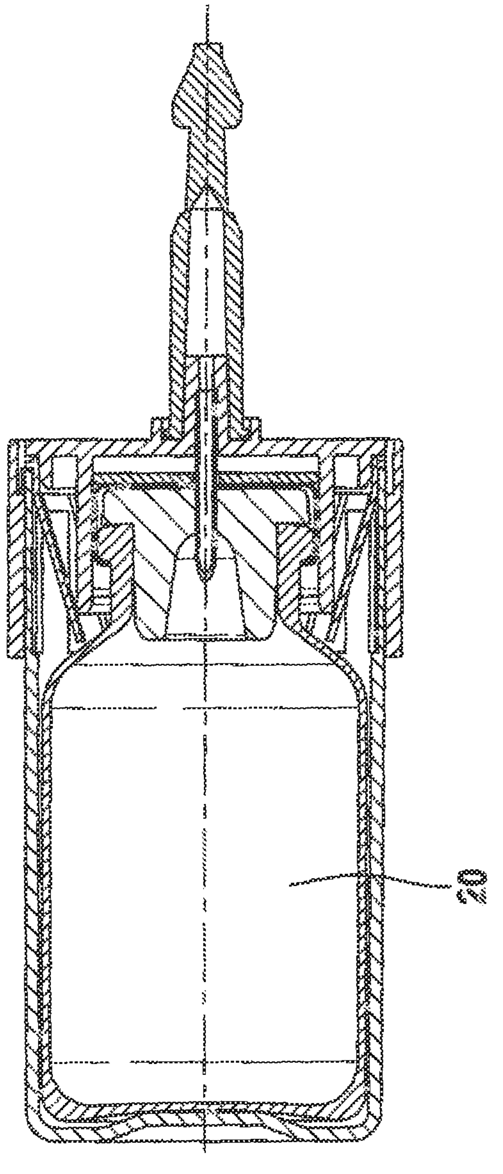
Figure 7A:
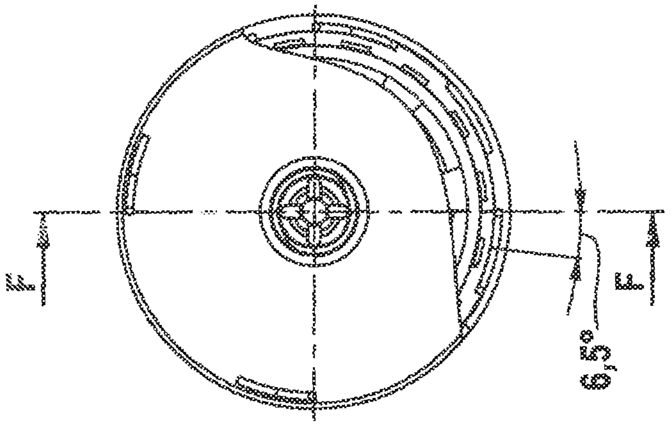
Figure 7B:
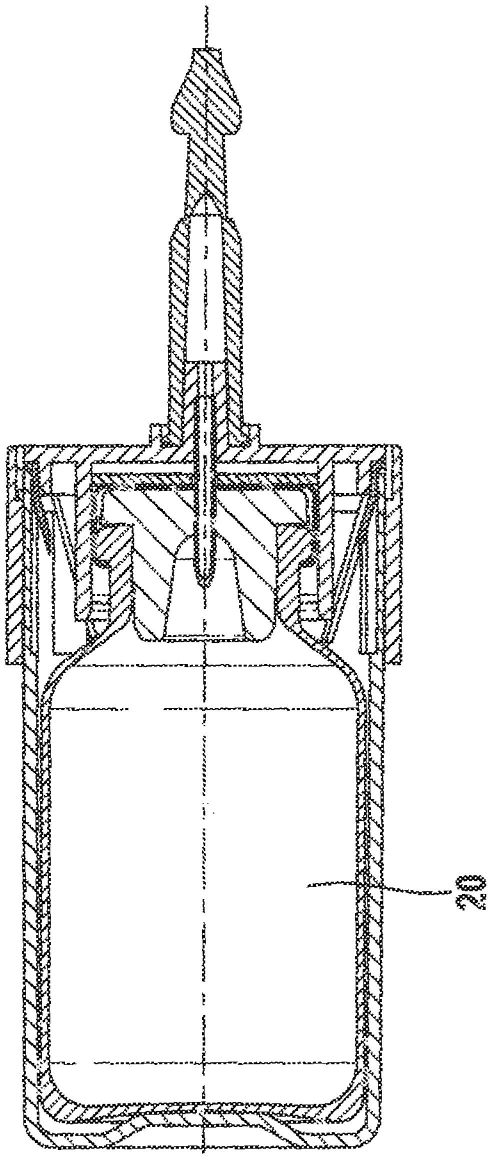
Figure 9:
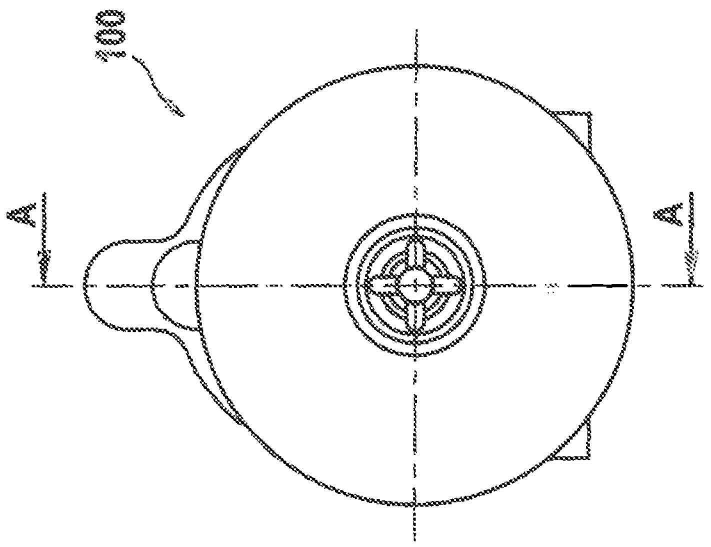
Figure 8:
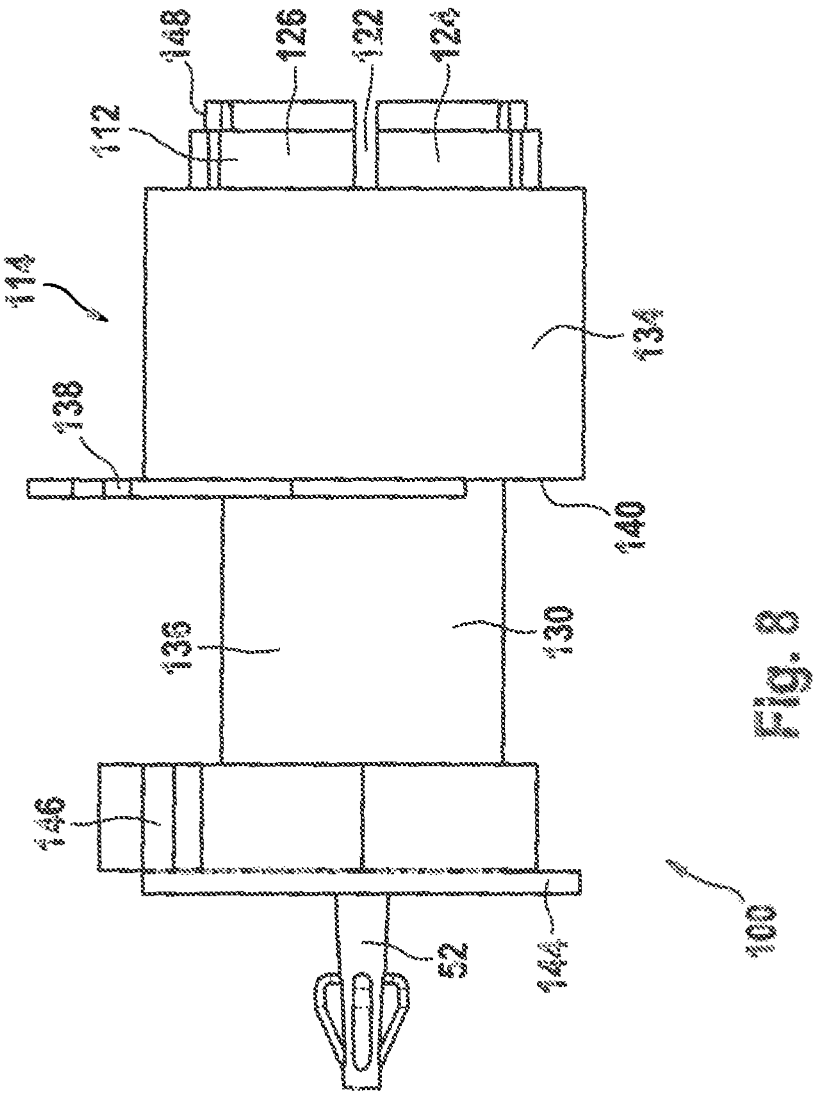
Figure 10:
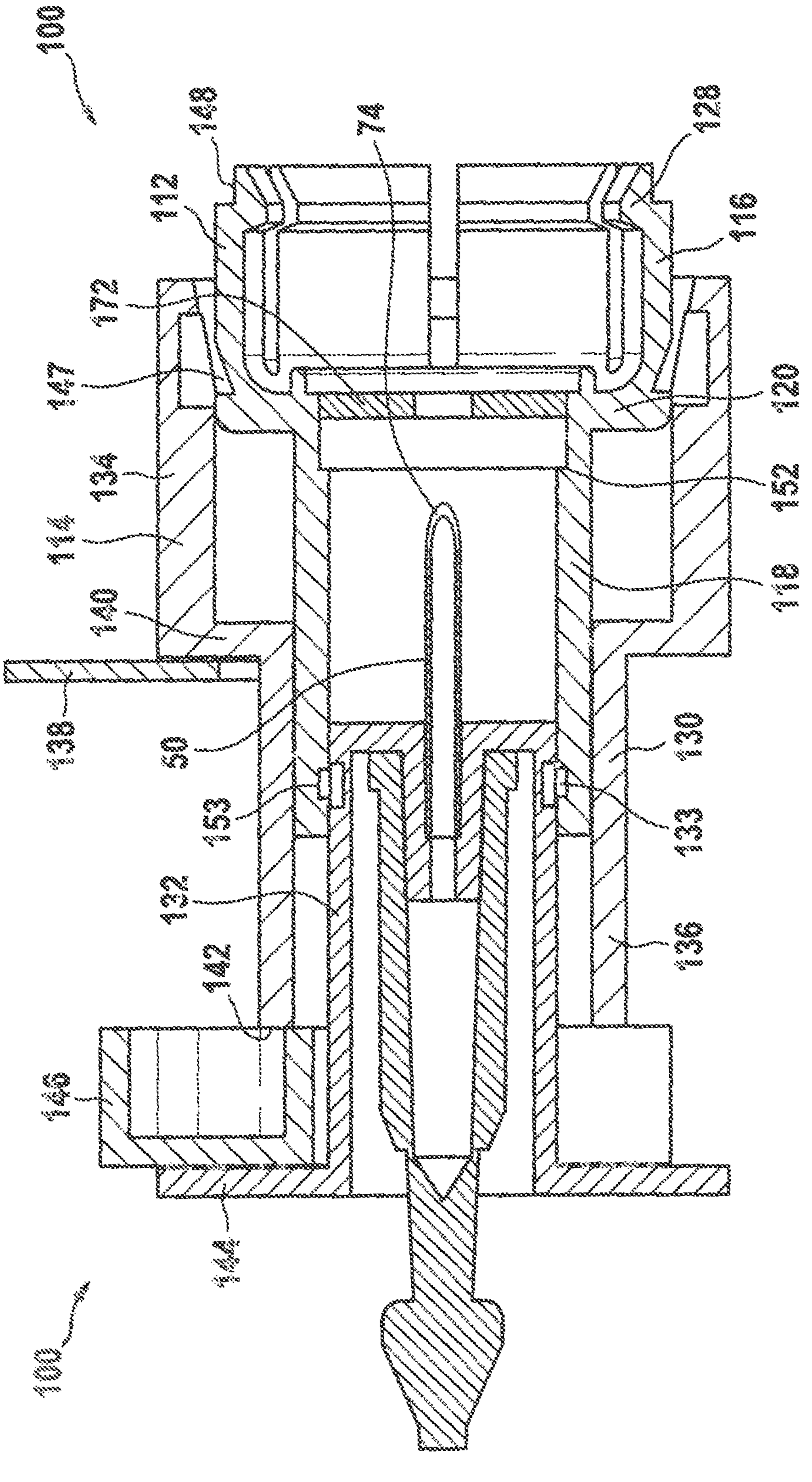
Figure 11A:
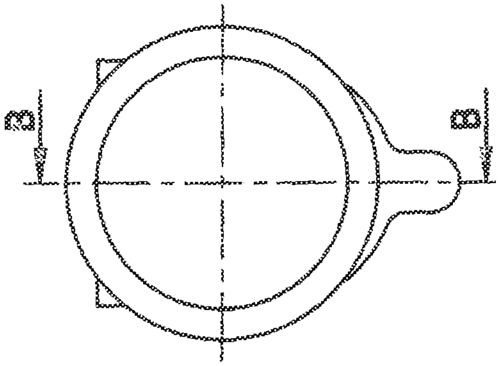
Figure 12A:
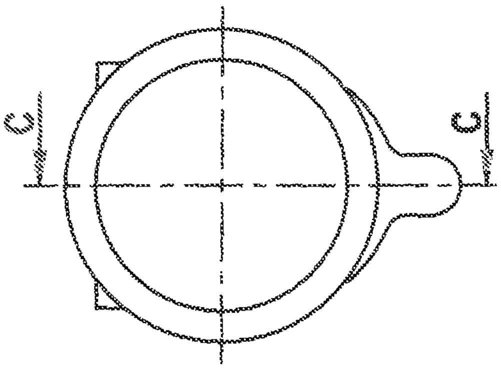
Figure 12B:
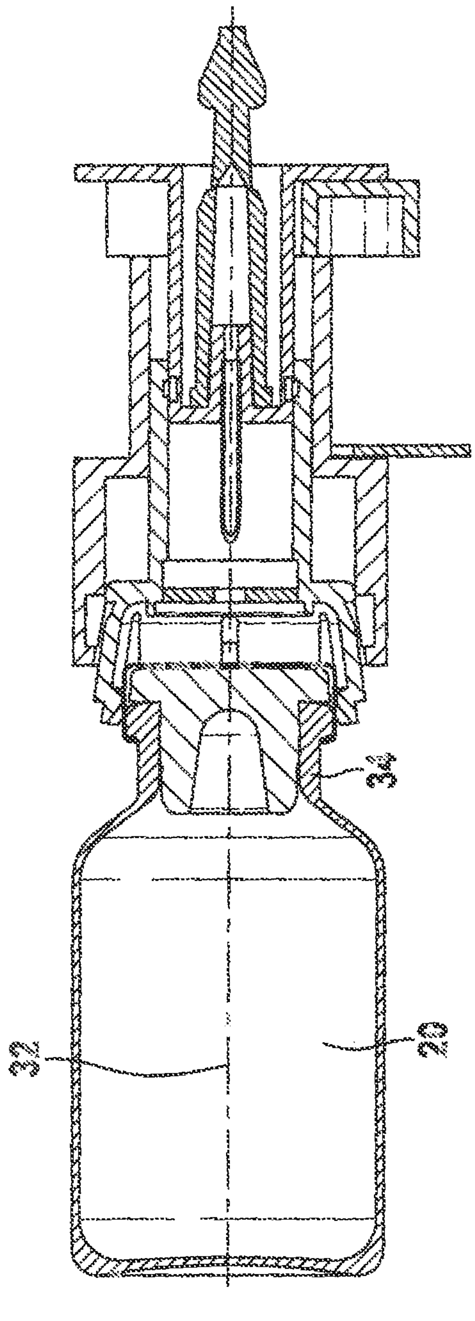
Figure 13A:
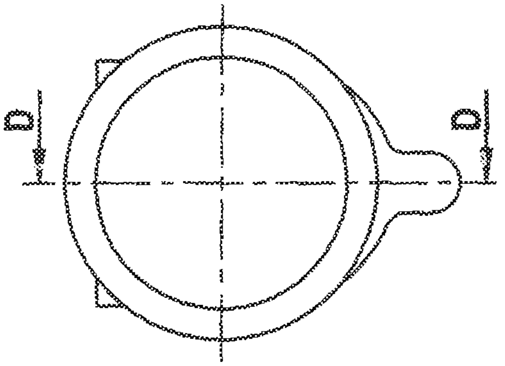
Figure 14A:
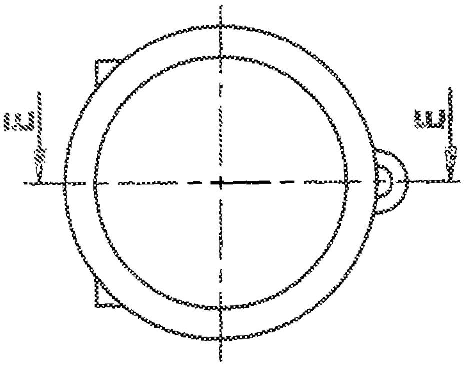
Figure 14B:
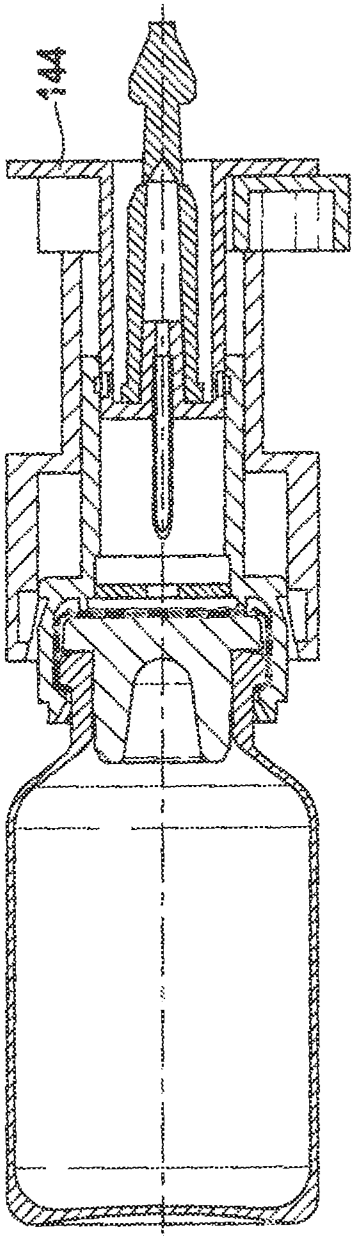
Figure 15A:
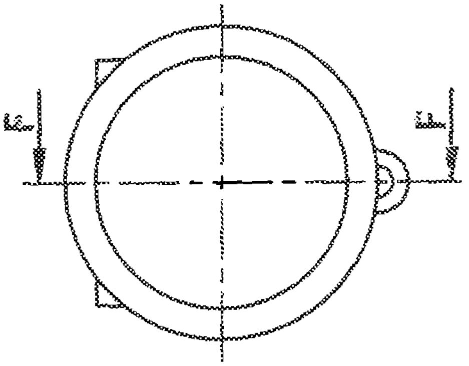
Figure 16A:
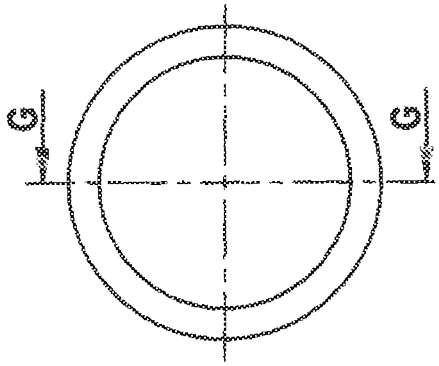
Figure 17A:
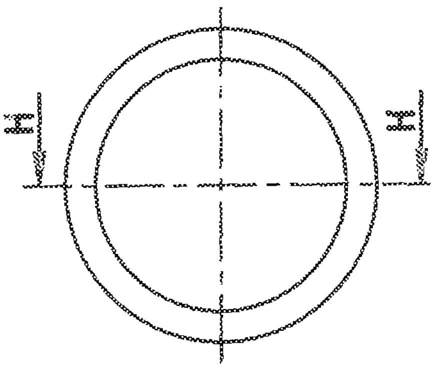
Figure 18:
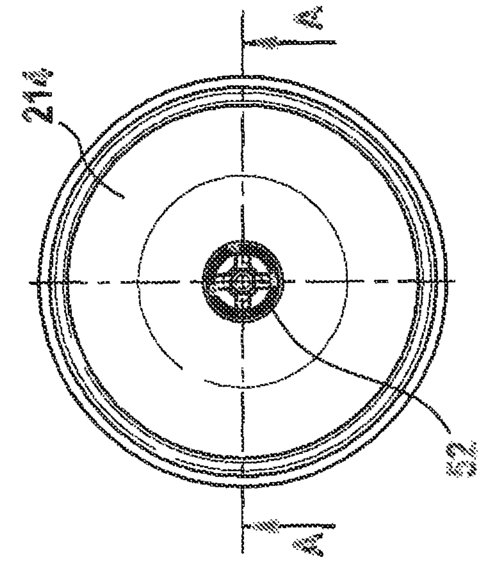
Figure 20:
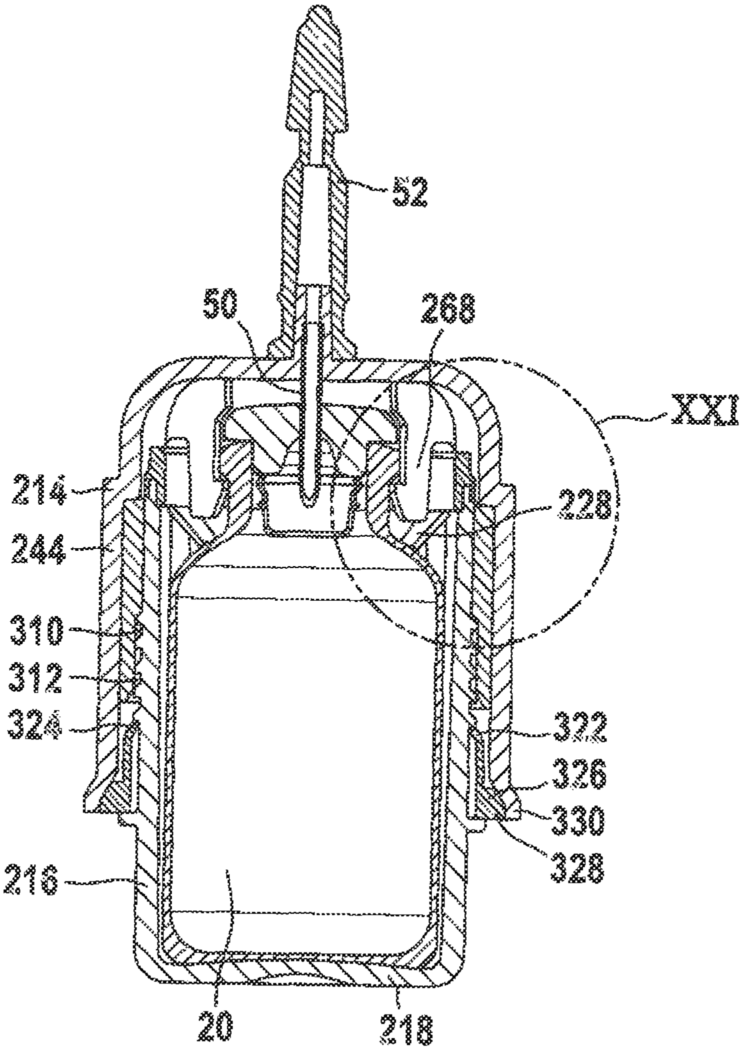
Figure 21:
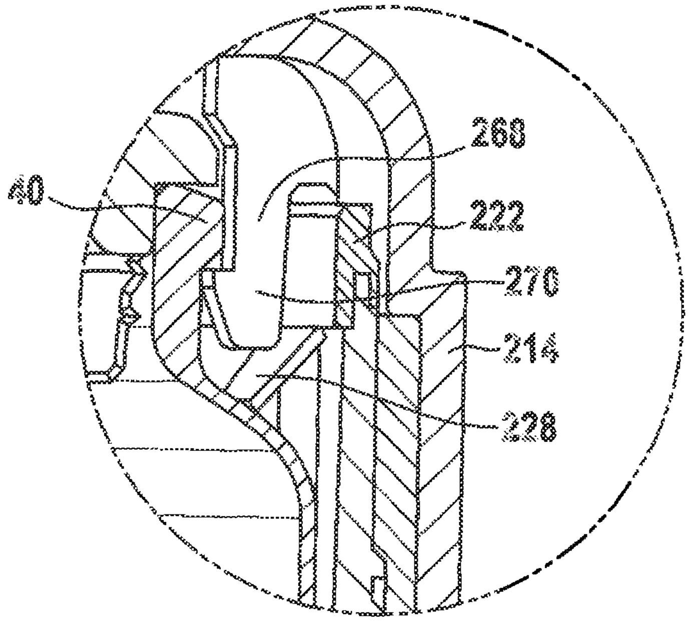
Figure 20A:
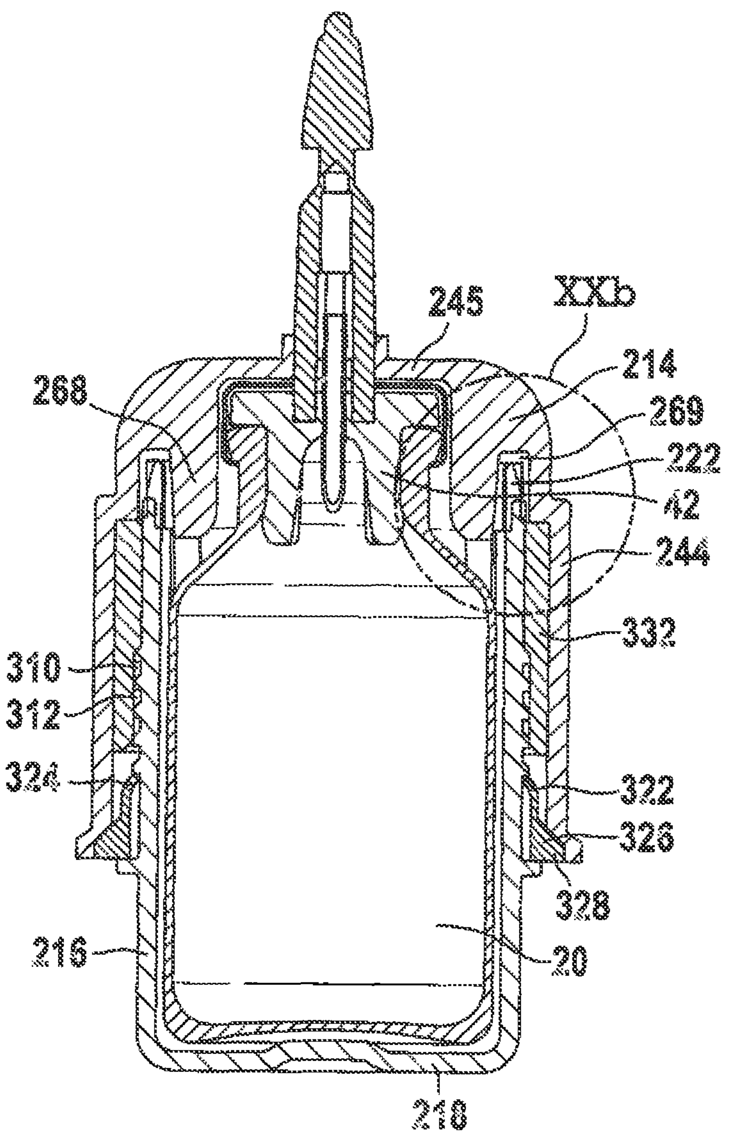
Figure 22:
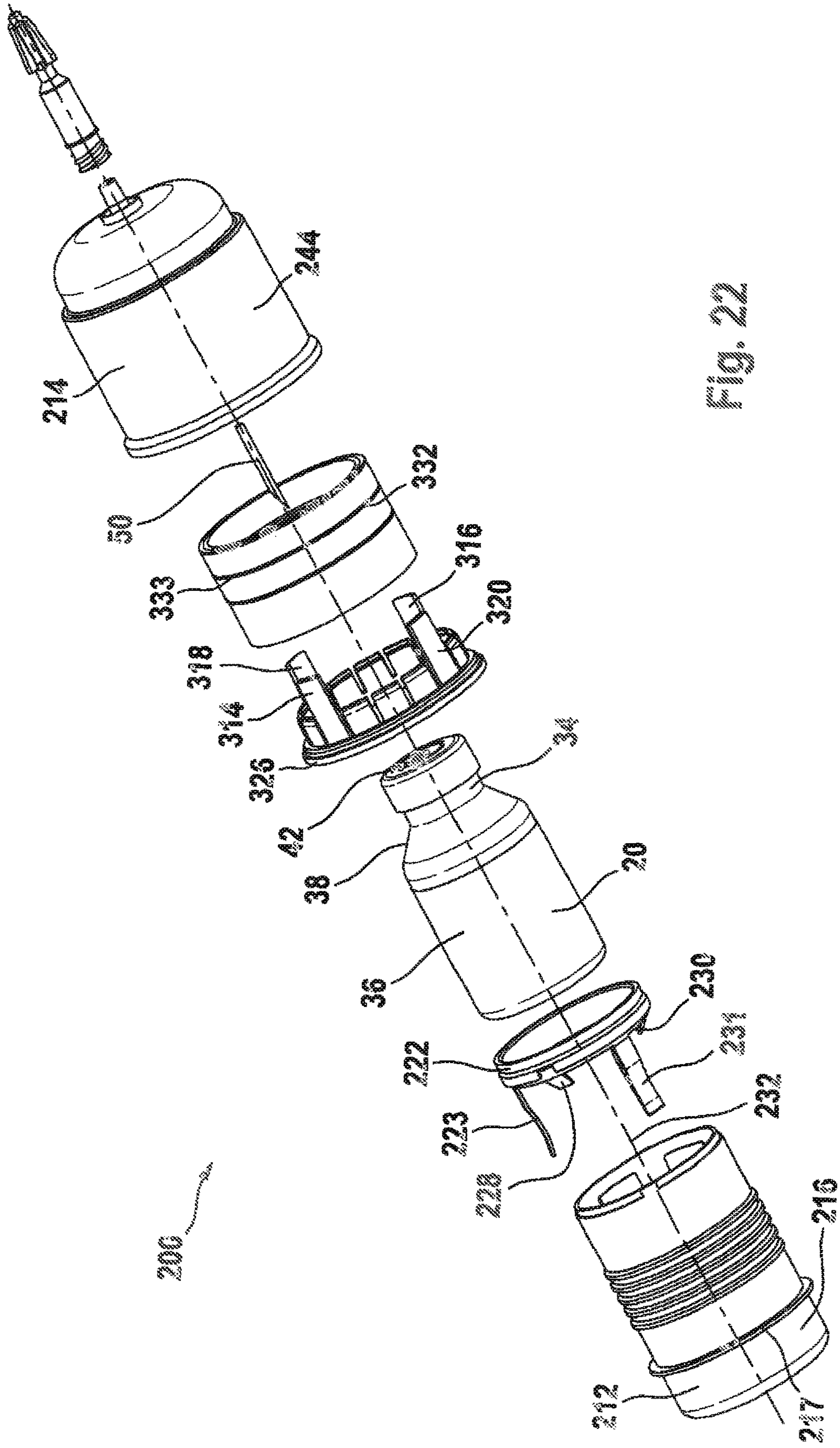
Figure 23A:
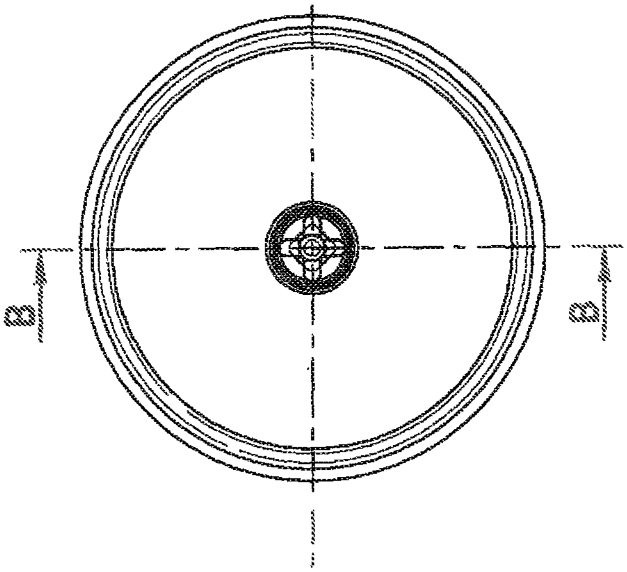
Figure 23B:
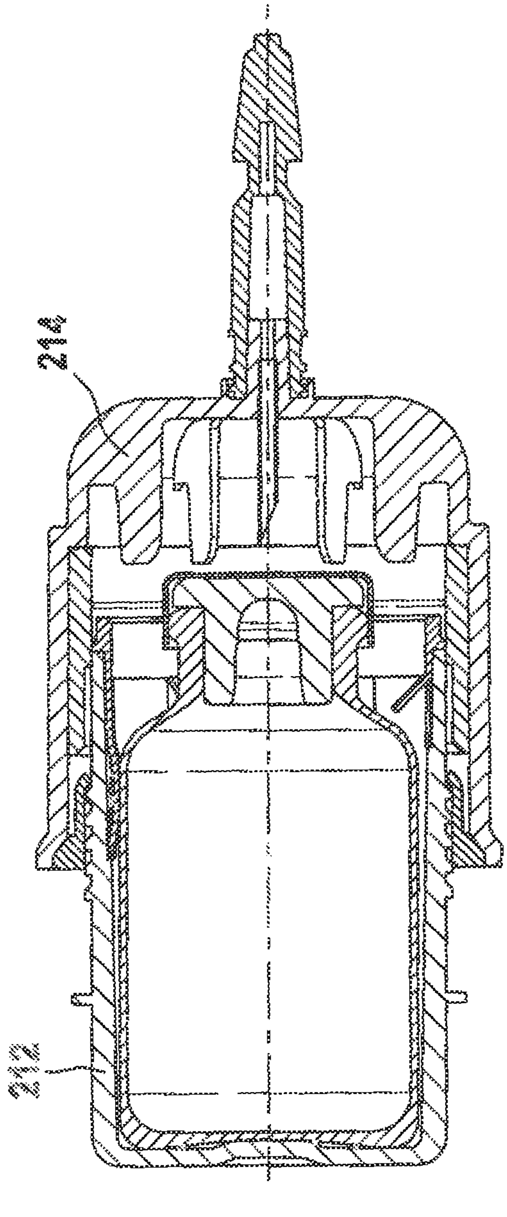
Figure 24A:
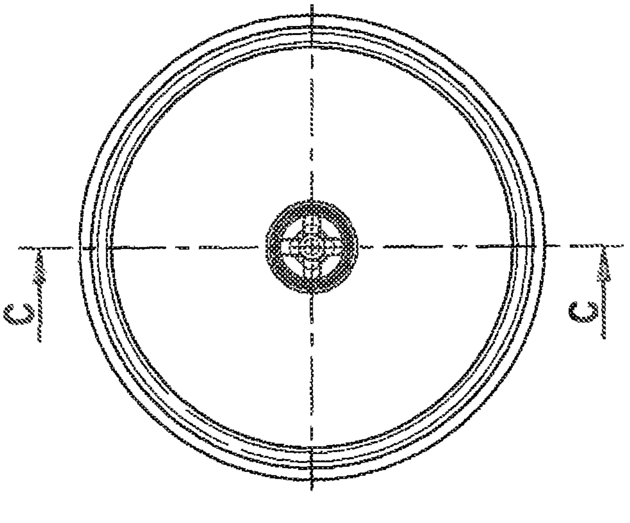
Figure 24B:
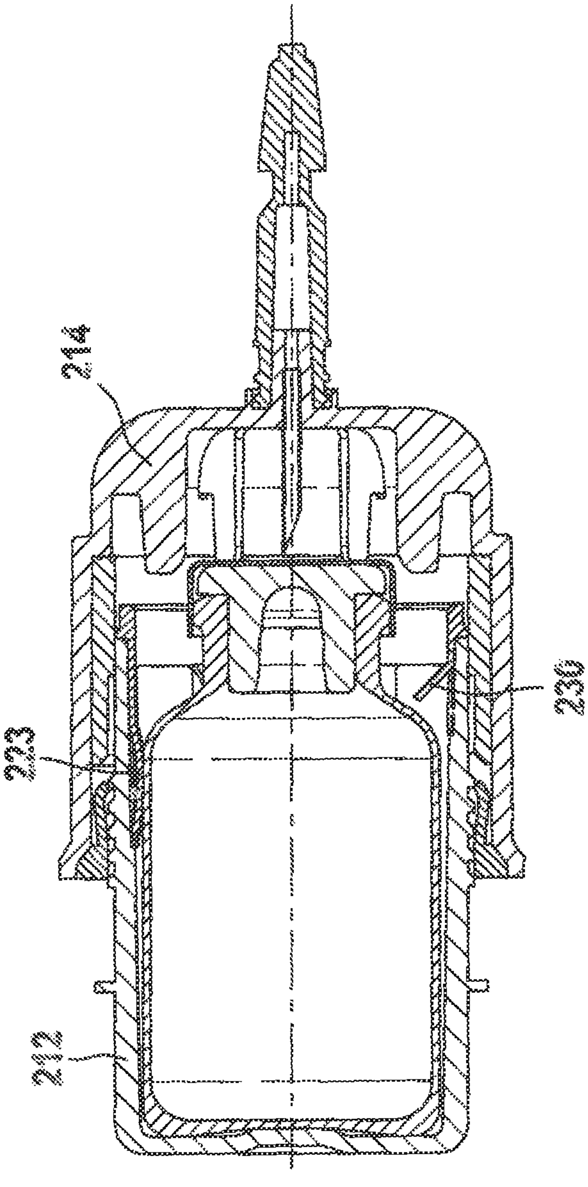
Figure 25A:
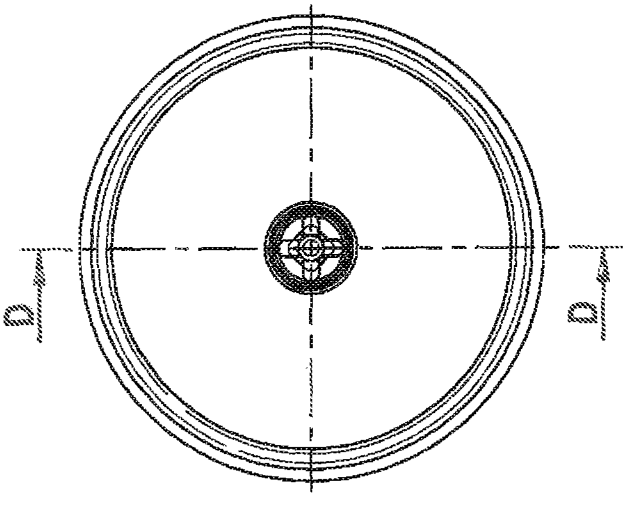
Figure 25B:
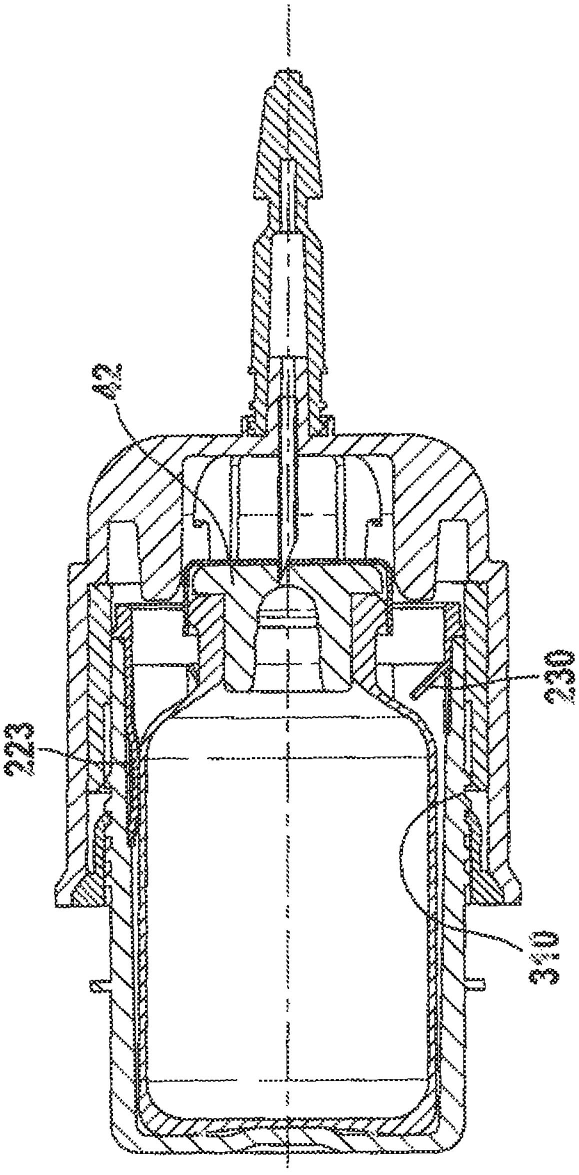
Figure 26A:
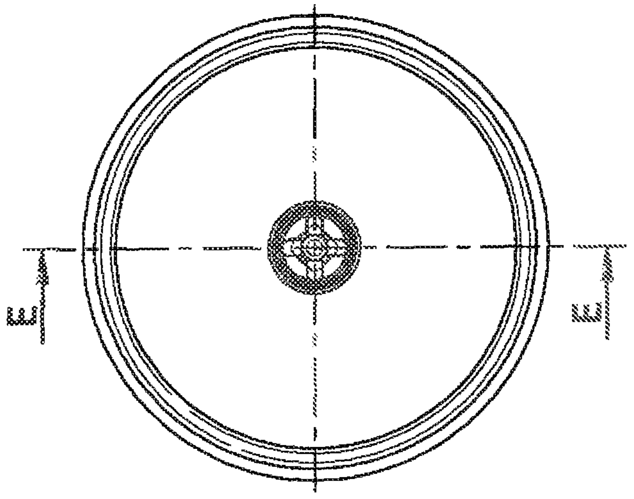
Figure 26B:
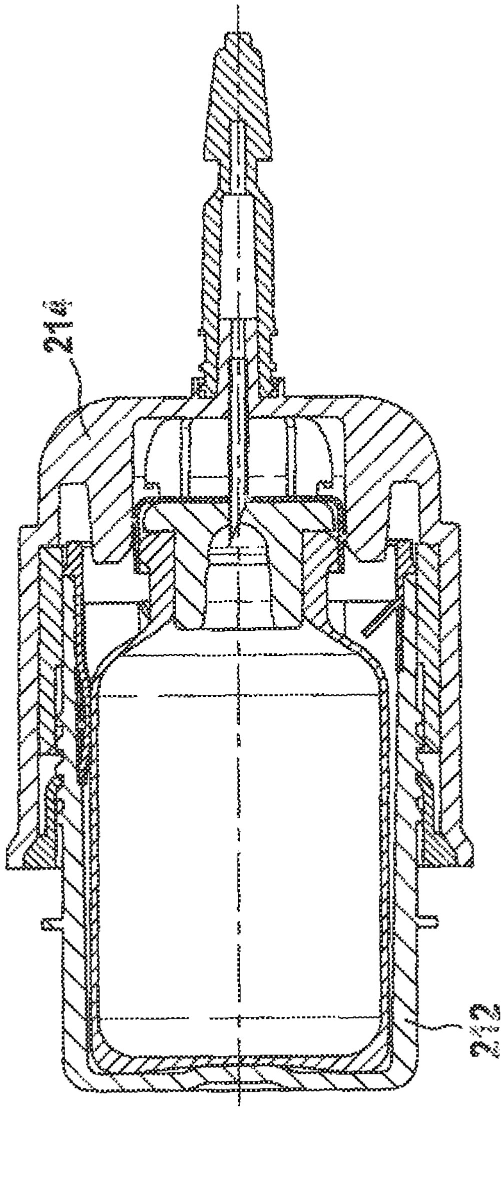
Figure 27A:
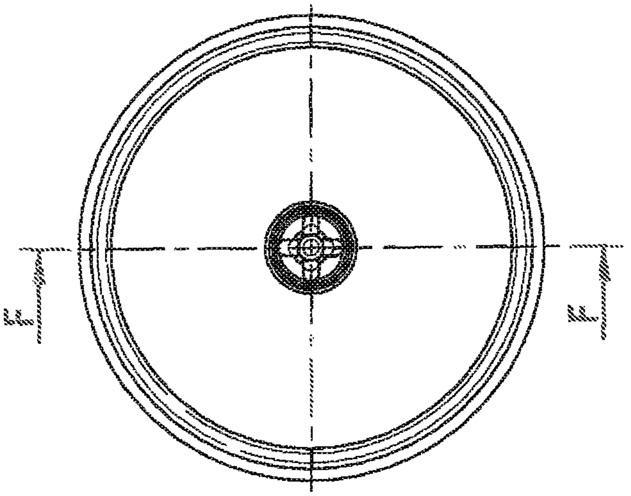
Figure 27B:
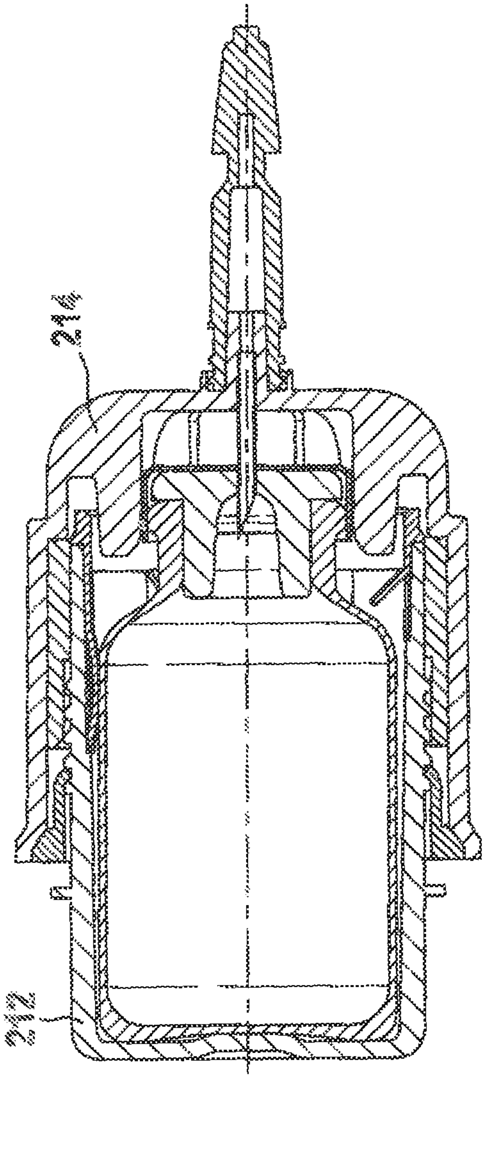
Figure 28A:
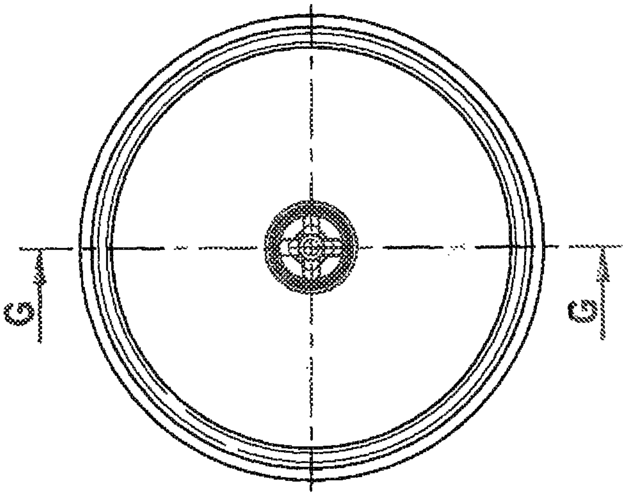
Figure 28B:
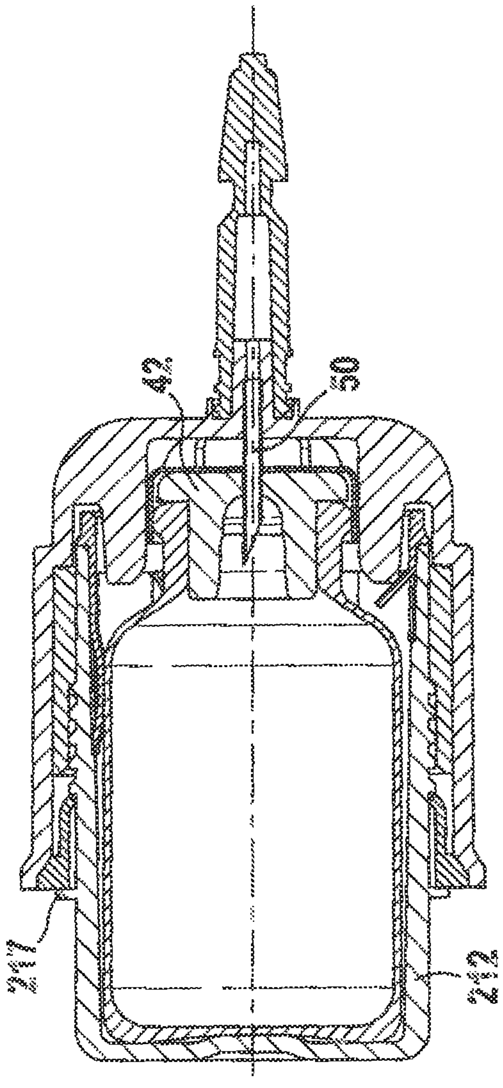
Figure 30:
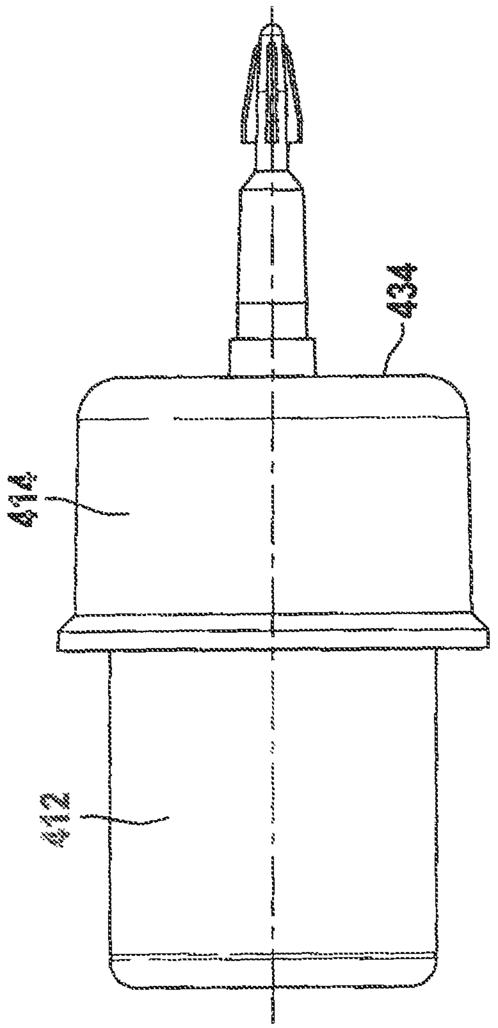
Figure 29:
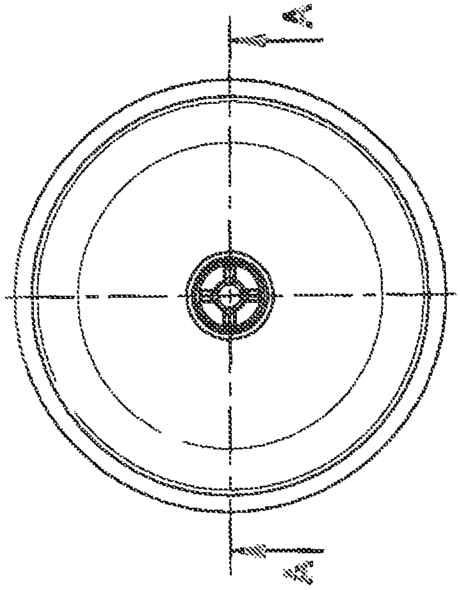
Figure 31:
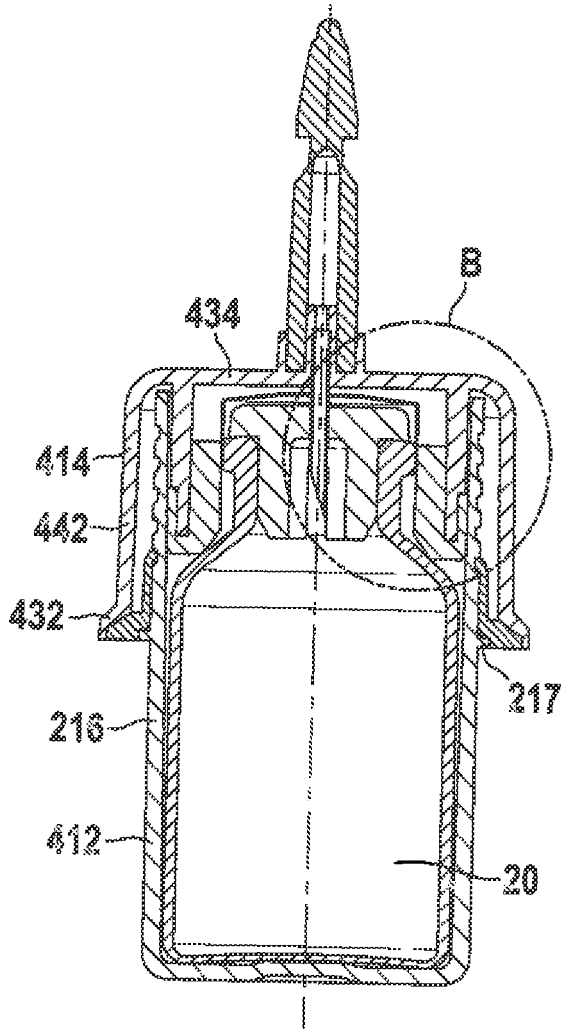
Figure 32:
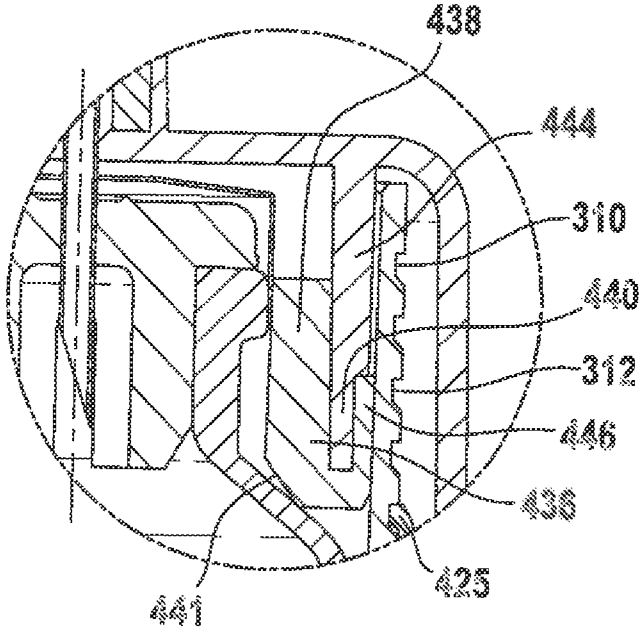
Figure 33A:
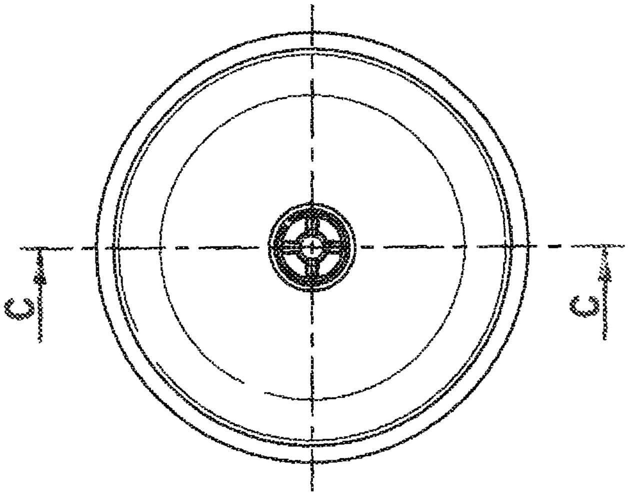
Figure 34A:
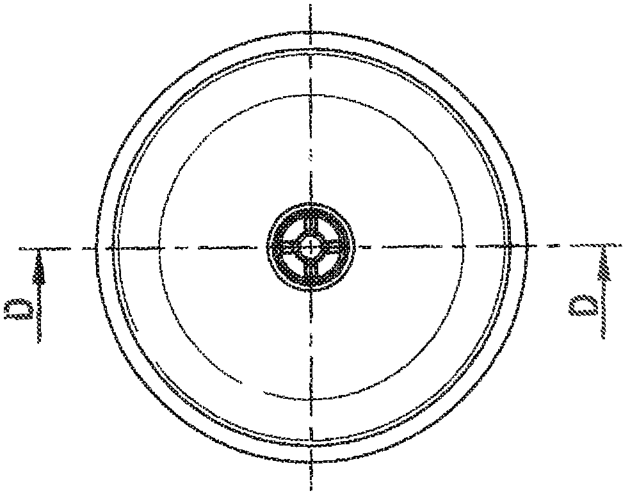
Figure 35A:
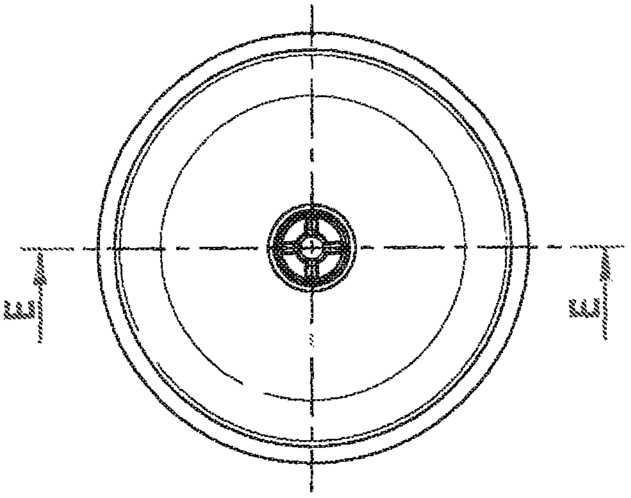
Figure 35B:
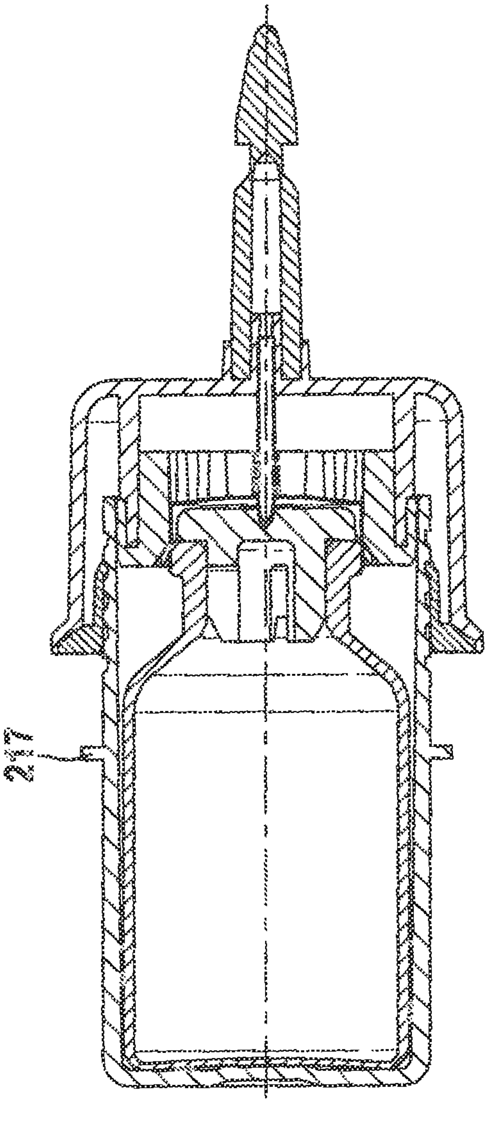
Figure 36A:
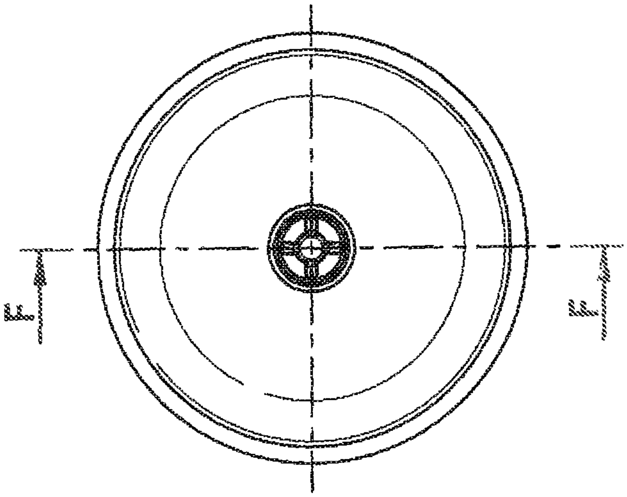
Figure 36B:
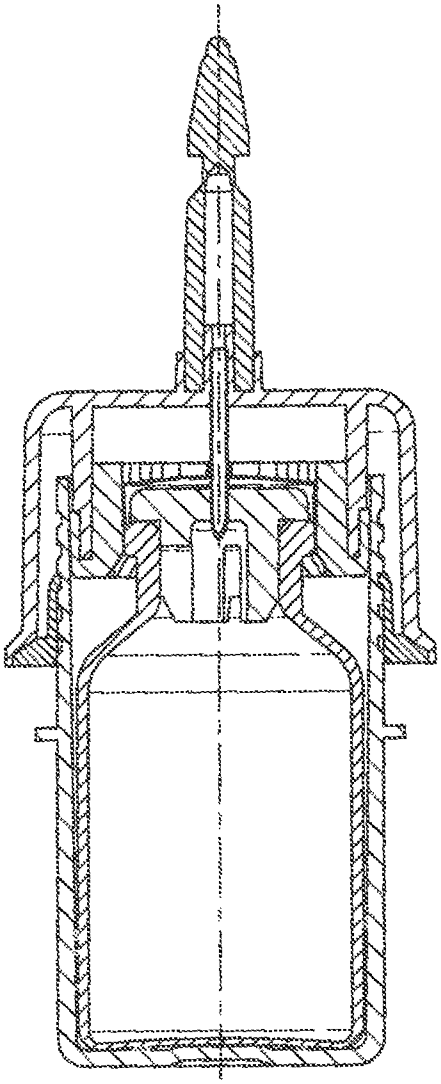
Figure 37A:
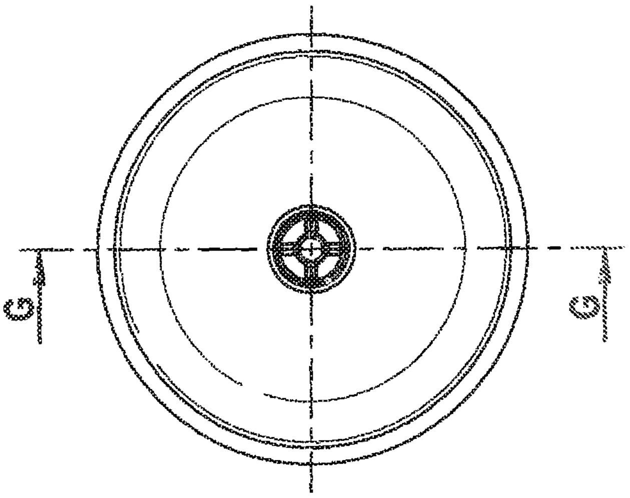
Figure 37B:
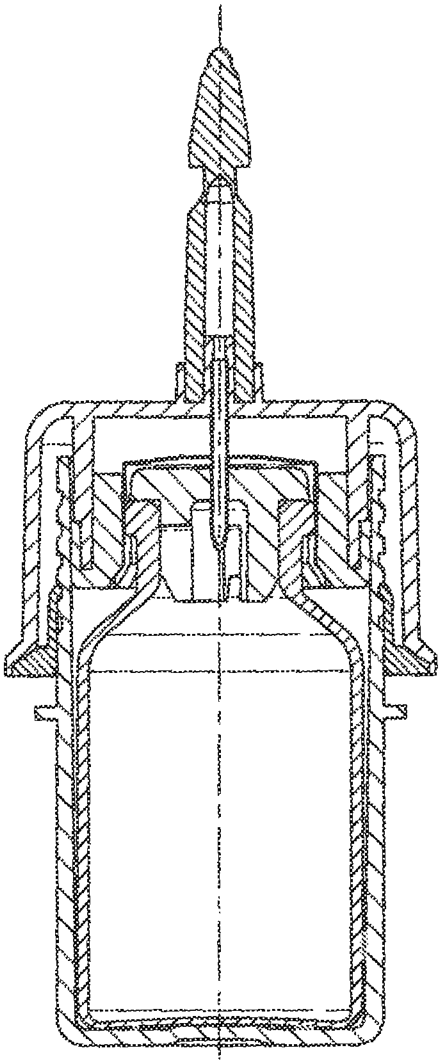
Figure 38A:
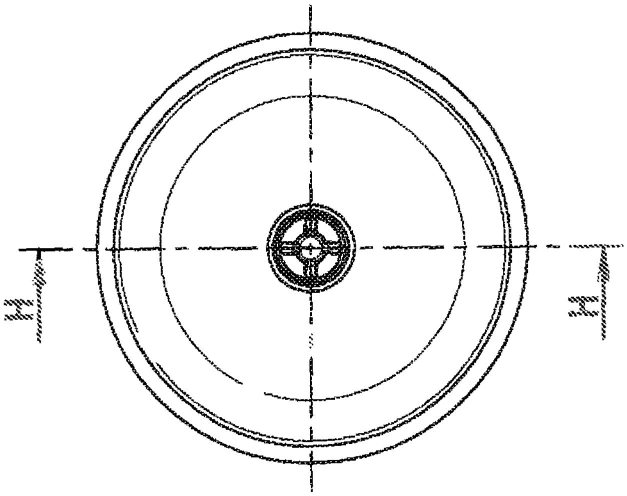
Figure 39:
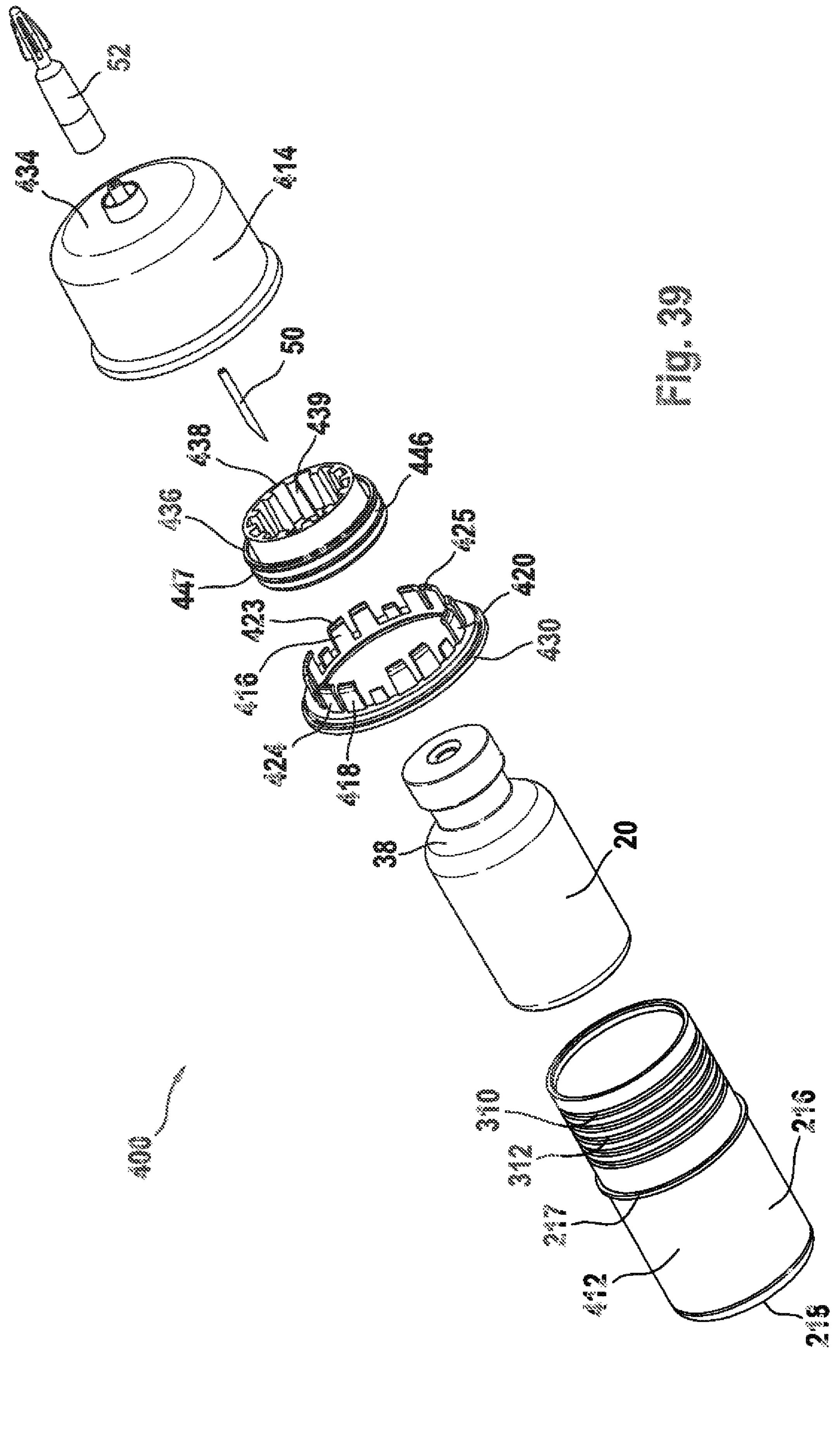

The Figures Show:

FIG. 1 shows an exploded view of a first embodiment of a transfer device,

FIG. 2 shows a first adapter component of the transfer device of FIG. 1, FIG. 3 shows a second adapter component of the transfer device of FIG. 1, FIG. 4*a*), 4*b*) shows the transfer device of FIG. 1, in a top view, and in a sectional view along the line C-C, FIG. 5*a*), 5*b*) shows the transfer device of FIG. 1, in a top view, and in a sectional view along the line D-D, FIG. 6*a*), 6*b*) shows the transfer device of FIG. 1, in a top view, and in a sectional view along the line E-E, FIG. 7*a*), 7*b*) shows the transfer device of FIG. 1, in a top view, and in a sectional view along the line F-F, FIG. 8 shows a lateral view of a second embodiment of a transfer device, FIG. 9 shows a top view onto the transfer device of FIG. 8, FIG. 10 shows a sectional view of the transfer device of FIGS. 8 and 9 along the line A-A, FIG. 11*a*), 11*b*) shows the transfer device of FIG. 8 with associated vial, in a top view, and in a sectional view along the line B-B, FIG. 12*a*), 12*b*) shows the transfer device of FIG. 8, in a top view, and in a sectional view along the line C-C, FIG. 13*a*), 13*b*) shows the transfer device of FIG. 8, in a top view, and in a sectional view along the line D-D, FIG. 14*a*), 14*b*) shows the transfer device of FIG. 8, in a top view, and in a sectional view along the line E-E, FIG. 15*a*), 15*b*) shows the transfer device of FIG. 8, in a top view, and along the line F-F, FIG. 16*a*), 16*b*) shows the transfer device of FIG. 8, in a top view, and in a sectional view along the line G-G, FIG. 17*a*), 17*b*) shows the transfer device of FIG. 8, in a top view, and in a sectional view along the line H-H, FIG. 18 shows a top view of an alternative to the configuration of the embodiment of the transfer device of FIGS. 1 to 7, FIG. 19 shows a lateral view of the transfer device of FIG. 18, FIG. 20 shows a sectional view along the line A-A of FIG. 18, FIG. 20*a*), 20*b*) shows a variant of the transfer device of FIG. 18, in a sectional view, and a detailed view, FIG. 21. shows a detail of FIG. 20, FIG. 22 shows an exploded view of the transfer device of FIGS. 18 to 21, FIG. 23*a*), 23*b*) shows the transfer device of FIG. 22, in a top view, and in a sectional view along the line B-B, FIG. 24*a*), 24*b*) shows the transfer device of FIG. 22, in a top view, and in a sectional view along the line C-C, FIG. 25*a*), 25*b*) shows the transfer device of FIG. 22, in a top view, and in a sectional view along the line D-D, FIG. 26*a*), 26*b*) shows the transfer device of FIG. 22, in a top view, and in a sectional view along the line E-E, FIG. 27*a*), 27*b*) shows the transfer device of FIG. 22, in a top view, and in a sectional view along the line F-F, FIG. 28*a*), 28*b*) shows the transfer device of FIG. 22, in a top view, and in a sectional view along the line G-G, FIG. 29 shows a top view of a further embodiment of a transfer device as an alternative to the one of FIGS. 18 to 28*b*), FIG. 30 shows a lateral view of the transfer device of FIG. 29, FIG. 31 shows a sectional view along the line A-A of FIG. 29, FIG. 32 shows a detail of FIG. 31, FIG. 33*a*), 33*b*) shows the transfer device of FIGS. 29 to 32, in a top view, and in a sectional view along the line C-C, FIG. 34*a*), 34*b*) shows the transfer device of FIGS. 29 to 32, in a top view, and in a sectional view along the line D-D, FIG. 35*a*), 35*b*) shows the transfer device of FIGS. 29 to 32, in a top view, and in a sectional view along the line E-E, FIG. 36*a*), 36*b*) shows the transfer device of FIGS. 29 to 32, in a top view, and in a sectional view along the line F-F, FIG. 37*a*), 37*b*) shows the transfer device of FIGS. 29 to 32, in a top view, and in a sectional view along the line G-G, FIG. 38*a*), 38*b*) shows the transfer device of FIGS. 29 to 32, in a top view, and in a sectional view along the line H-H, and FIG. 39 shows an exploded view of the transfer device of FIGS. 29 to 32.

The figures, in which identical elements always have the same reference labels, show transfer devices, by means of which fluids as well as dry substances or liquids such as water or solvents, which for infusion or injection purposes are blended prior to their use or administration, are delivered from a bottle or a small bottle, a so-called vial. Use for the purpose of instillation or for solvent bags is also possible. Apart from that, the possible applications are purely exemplary. Transfer devices of this type are also referred to as connectors or adapters. In order to connect the bottle to another container or an infusion device, a corresponding transfer device is needed to perforate the seal of the small bottle by means of a puncture needle, such as a steel cannula, to subsequently be able to deliver the fluid to be withdrawn from the small bottle via the transfer device for example to an injection bottle, an infusion bag, a solving agent bag, or to a syringe.

The transfer devices shown in the figures possess components, which are arranged telescopically and are adjustable relative to each other, and which are referred to as the first and the second adapter components. For simplicity's sake, the transfer device will be referred to as a connector and the small bottle to be connected to the former will be referred to as a vial hereinafter. The first adapter component may also be referred to as a vial holder and the second adapter component as a cannula holder.

Further, the delivery element creating the connection to the interior of the vial will be referred to as a cannula hereinafter, without this representing a limitation with respect to function or design.

With respect to the specified geometries of the components it should be noted that these should be understood to be purely provided as examples and that variations are possible if the basic principles of the invention can still be realized. Apart from that, the figures are self-explanatory and show the characteristic features of the invention in an easily discernable manner.

The connector 10 of FIGS. 1 to 7 comprises a first adapter component 12 and a second adapter component 14 as fundamental elements. The first adapter component 12 has a cup-like geometry with a circumferential wall 16 referred to as a casing wall and a bottom wall 18, to accommodate a small bottle, i.e. vial 20, which can be inserted into the first adapter component 12. The bottom wall 18 ensures that the vial 20 remains in the first adapter component 12. For this, the bottom wall 18 does not have to be entirely closed. But preferably a closed bottom wall 18 is provided to provide an enclosed system that offers the option of a leak-proofness for aerosols and leakages, as is described in the following.

As can be seen in the detailed representation of FIG. 2, in the open edge region of the circumferential wall 16, which also is referred to as casing section, is provided with a holding element, also referred to as annular element or annular section 22, which on its front edge side comprises elastic first projections, which are compressible in the axial direction, and some of which are marked by the reference labels 24, 26. As the detailed representation of FIG. 2 illustrates, the annular element 22 in sections encompasses the front edge of the circumferential wall 16, to ensure a proper securing in place.

From the region of the ring element 22 that extends in the interior of the casing wall 16 originate ledge- or tongue-shaped elements that extend in the axial direction and are also referred to as position-securing elements, some of which are marked with the reference labels 28, 30. As is particularly evident in the exploded view of FIG. 1 as well as FIGS. 4 to 7, the tongue-shaped elements 28, 30 extend inclined relative to the longitudinal axis 32 of the first adapter component 12 and thus of the vial 20, which secures the first adapter component 12 on the vial 20, since as is shown in FIGS. 4 to 7, when the vial 20 is positioned within the first adapter component 12, the tongue-shaped elements 28, 30 support themselves on the connecting wall 38, also to be referred to as transition, that extends obliquely between the bottle neck 34 of the vial 20 and its cylindrical body 36. Consequently, the vial 20 can no longer be withdrawn from the first adapter component 12. Thus, the first adapter component 12 is the vial holder.

With respect to the vial 20 it should also be noted that the bottle neck 34 in the area of its opening comprises a circumferential collar 40. The opening of the vial 20 is closed by a plug 42. Further it should be noted that typically after sealing the vial 20 with the sealing plug 42, an aluminum crimp cap is applied. On top of this may be located a plastic flip-off cap. This flip-off cap is pulled off the aluminum crimp cap, creating an opening in the centre of the aluminum crimp cap, through which the closure plug 42 is visible.

The second adapter component 14, also referred to as upper adapter component or outer component, comprises a hollow-cylindrical section 44, which on the side opposite the vial is delimited by a wall 46, which extends across the longitudinal axis 32 and is also referred to as a boundary wall, which centrically comprises a cylindrical extension 48, from which not only originates the penetration needle 50 that is also referred to as cannula but onto which is also attached a snap-off connector 52 on its outside. Consequently, the second adapter component 14 is the cannula holder.

Embodied in the inner wall 54 of the hollow-cylindrical section 44 of the second adapter component 14 are recesses 56, 58 that form guides (FIG. 3), each of which consists of an axially extending section 60 and, extending crosswise to the latter and along the wall 46, a section 62. Associated with each guide 56, 58 is a second projection 64, 66, which protrudes radially outward from the circumferential wall 16 of the first adapter component 12 (FIG. 2), in order to be able to interlock the first adapter component 12 with the second adapter component 14 in the manner described in the following.

An inner hollow-cylindrical section 68 extends coaxial relative to the outer hollow-cylindrical section 44 and within the former extends the cannula 50, but the latter does not protrude beyond the former's front edge 70, as is evident in particular in FIGS. 4 to 7. In accordance with the graphic representations of the embodiment example, the inner hollow-cylindrical section 68 accepts in a clamping manner a disk-shaped protective element 72, which is adjustable along the axial direction of the inner hollow-cylindrical section 68. However, when the connector 10 is not in use, the tip 74 of the cannula 50 extends between the protective element 72 and the wall 46, and consequently is covered towards the outside, so that the user is protected against injuries. The protective element 72 represents a configuration that is not absolutely necessary.

But it is also possible that instead of for example the disk shaped protective element 72, a membrane, for example, originates from the front edge 70 of the inner hollow-cylindrical section 68, whereby the membrane is destroyed when the adapter components 12, 14 are assembled or during an axial displacement of the second adapter component 14 towards the vial 20 and thus towards the first adapter component 12.

As is evident in the graphic representations of FIGS. 2 and 3, the inner section 62 of the guide 56, 58 that extends across the longitudinal axis 32 possesses along its axial direction a reduction in cross section formed by a step 76. The step 76 results in a 'restriction' of the section 62, i.e. the distance between the free edge or corner 78 of the respective second projection 64, 66 and the apex area of the first projections 24, 26 is greater than the distance between the crest of the step 76 and the opposing edge of the section 62. Consequently, the first projections 24, 26 must compressed to overcome the step 76. Once the projection 64, 66 is situated within the end section 80 of the section 62 of the guide 56, 56 that extends along the wall 46, the projections 24, 26 are free to expand again with the result that when the first adapter component 12 is rotated relative to the second adapter component 14 in the direction of the step 76, the projection 64, 66 protruding from the outside of the casing wall 16 interacts with the step 76 to prevent a further rotation. Thus the first and the second adapter components 12, 14 are connected inseparably. A removal of the vial 20 is not possible either.

In order to support an axial guidance between the adapter components 12, 14 when they are telescoped together, ribs 17, 19 extending in the longitudinal direction over the casing wall 16 can serve as guide rails.

Connecting the cannula 50 to the interior of the vial 20 is shown in FIGS. 4 to 7 in a self-explanatory fashion. FIG. 4 shows the position in which the second adapter component 14 has been attached to the first adapter component 12. In this, the second adapter component 14 with its outer hollow-cylindrical section 44 surrounds the casing wall 16 and is guided by the latter. To prevent tilting, the inner diameter of the hollow-cylindrical section 44 and the outer diameter of the casing wall 16 are matched accordingly. The guidance ensures that the cannula is moveable along the longitudinal axis 32 of the vial 20, when the first and the second adapter components 12, 14 are telescoped together. But the ribs 17, 19 extending along the longitudinal axis direction in particular serve to align the adapter components 12, 14 to a proper relative position to be moved relative to each other. Movements are facilitated by the resulting linear contact area between the adapter components 12, 14. Moreover, the ribs 17, 19 prevent tilting.

FIG. 5 shows the position when the cannula 50 has penetrated the plug 42 and the cannula tip 74 is connected to the interior of the vial 20. In this position, the projections 64, 66, which protrude from the outside of the casing wall 16 and preferably possess an irregular trapezoidal geometry, are positioned at the transition between the axially extending sections 60 of the guides 56, 58 and the sections 62 that extend crosswise thereto. Subsequently, the upper adapter component or second adapter component 12 is rotated (FIG.

6) so that the second projections 64, 66 are moved along the sections 62 of the guides 56, 58 that extend along the wall 46. The first and the second adapter component 12, 14 interlock when the second projections 64, 66 have overcome the steps 76 in the sections 62 of the guides 56, 58, and are situated in the respective end section 80 of the guides 56, 58. In order to overcome the steps 76 it is necessary beforehand that the first projections 24, 26 protruding axially from the front edge of the annular element 22 are compressed to the required extent.

In this, the interlocking is achieved so that it can only be released with an additional tool or with a pulling force of at least for example 300 N.

After the connection to the vial 20 has been ensured, the snap-off connector 52 can be destroyed and the mixing procedure between the medicinal product present in the vial 20 and a liquid, present in a bag that was previously connected to the snap-off connector 52, may proceed. In principle, it is also possible to employ a Luer fitting or similar device. Connected to the snap-off connector, or similar device such as a Luer fitting, may also be a syringe, bottle, or similar container. The corresponding applies to all embodiments.

FIGS. 8 to 17 show a second embodiment of a connector 100, which also consists of a first adapter component 112 as the vial holder extending on the vial side and a second adapter component 114 comprising the cannula 50 as the cannula holder. In this, the connector 100 is also embodied in such a manner that after it is connected to the vial 20, an inadvertent or uncontrolled detachment from the vial 20 is no longer possible, as will be explained in the following.

The first or inner adapter component 112 comprises a first outer hollow-cylindrical section 116 that during correct usage surrounds the collar 40 of the vial 20, and an inner hollow-cylindrical section 118, which has a smaller diameter than the outer hollow-cylindrical section 116. Between the hollow-cylindrical sections 116, 118 extends an intermediate wall 120, which extends across, in particular perpendicular to, the longitudinal axis 32 of the connector 100, and thus, when the vial 20 is connected, to the longitudinal axis of the vial 20.

The outer hollow-cylindrical section 116 comprises tongue-shaped sections, which are separated by axially extending slits 122, and which are resilient to the required degree, two of which are marked by the reference labels 124, 126 in an exemplary manner. On their end side, the tongue-shaped sections 124, 126 comprise projections that protrude inward (compare projection 128), and which engage behind the collar-like rim 40 of the vial neck when the first adapter component 112 has been properly connected to the vial 20, as is illustrated in the figures below.

The second or outer adapter component 114 consists of two parts that are adjustable relative to each other in a telescopic manner, in particular of an outer part 130 and an inner part 132, from which originates the puncture needle 50. The outer part 130 comprises a section 134, also referred to as second outer hollow-cylindrical section, and a section 136 that is designates as third outer hollow-cylindrical section, which possess different diameters. In this, the cross-section of the third outer hollow-cylindrical section 136 is smaller than that of the second outer hollow-cylindrical section 134, which has an interior diameter that is adapted to the exterior diameter of the first outer hollow-cylindrical section 116 of the first adapter component 112, which facilitates an axial guidance. Moreover, the inner diameter of the third outer hollow-cylindrical section 136 is adapted to fit the outer diameter of the first hollow-cylindrical section 118 of the first adapter component 112, which also results in an axial guidance.

For placing the connector 100 onto the vial 20, the first and second adapter components 112, 114 are secured against an axial movement relative to each other by a first safety 138, which preferably possesses the geometry of an annular section. The safety 138 extends along a further intermediate wall 140, which extends between the second and the third hollow-cylindrical sections 134, 136 and in parallel to the intermediate wall 120, passes through a slot in the third outer hollow-cylindrical section 136, and extends partially in a recess or groove, which is aligned with the slot, in the first inner hollow-cylindrical section 118 of the first adapter component 112. A second safety 146 extends between the front edge 142 of the third outer cylinder section 136 and a flange-like widening originating from the inner or second part 132 of the second adapter component 112.

The inner part 132 of the second adapter component 114 has a hollow-cylindrical shape, with an outer diameter that is adapted to fit the inner diameter of the first inner hollow-cylindrical section 118 of the first adapter component 112, which facilitates an axial guidance. Moreover, the second part 132 of the second adapter component 114 is secured relative to the first inner hollow-cylindrical section 118 by inter-engaging sections, in particular by a preferably circumferential rib 133, which protrudes above the circumferential wall of the hollow-cylindrical inner or second part 132 of the second adapter component 114, and engages in a correspondingly matched recess 153 in the inner side of the first inner hollow-cylindrical section 118 of the first adapter component 112.

It is also apparent in the drawing that from the inner side of the second outer hollow-cylindrical section 134 of the second adapter component 114 protrudes a projection such as a clamping rib 147, which engages in a matched recess 148 of the first outer hollow-cylindrical section 116 of the first adapter component 112 in such a way that a disconnection of the adapter components 112, 114 against the penetration direction is no longer possible. Thus prior to attaching the connector 100 to the vial 20, one is handling a unit that consists of the first and the second adapter components 112, 114.

To prevent a user from coming in contact with the tip 74 of the cannula 50, in an optional configuration otherwise in accordance with the embodiment example of FIGS. 1 to 7, the first inner hollow-cylindrical section 118 of the first adapter component 112 can accept in a clamping manner a disk-shaped protective element 172 that can have a centric opening in order not to impede the passage of the cannula 50 during the penetration of the plug 42. Instead of the disk element, it is possible that a membrane is provided that is destroyed in the process.

FIGS. 11-17 illustrate how the connector 100 is connected with the vial 20 and the latter's plug 42 is penetrated. In this respect the figures are self-explanatory.

Figure 11B:
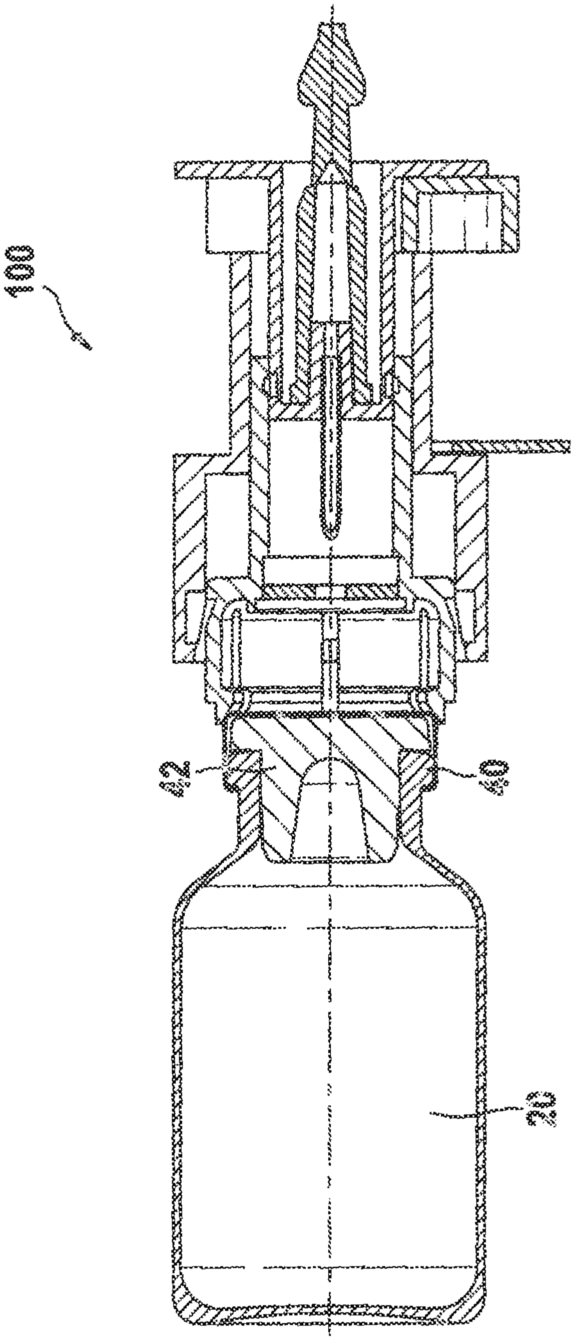
Figure 13B:
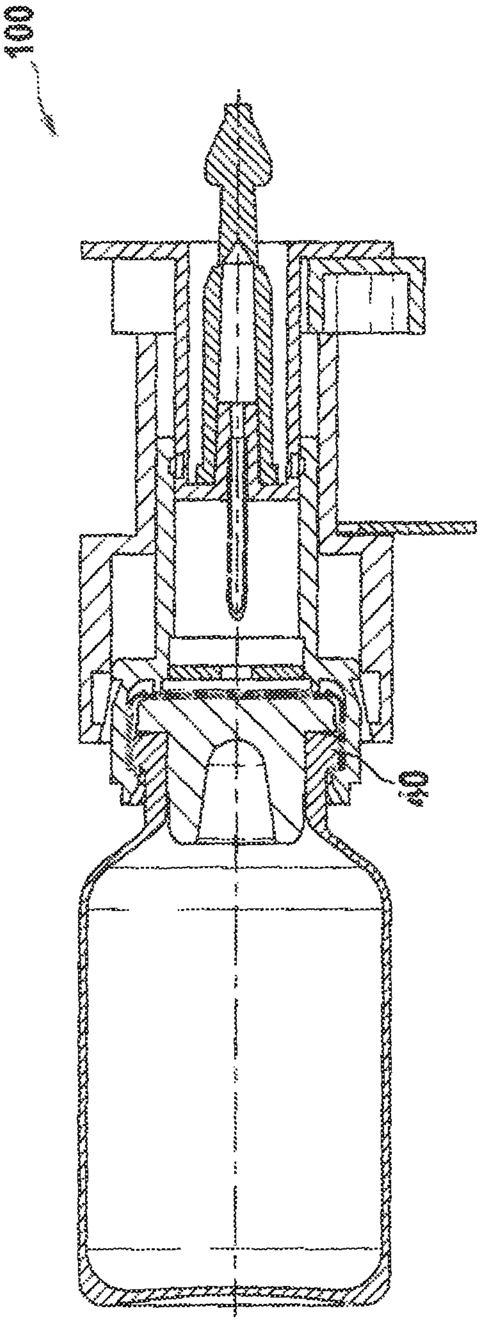

In the illustration of FIG. 11 the connector 100 is aligned with the bottle neck 34 of the vial 20 in such a manner that the longitudinal axis of the connector 100 is aligned with the longitudinal axis 32 of the vial 20. Due to the safeties mechanisms 138, 146 and the interlocking projections and clamping ribs, the second adapter component 114 is arranged relative to the first adapter component 112 in such a manner that the first adapter component 112 can overcome the collar 40 of the bottle neck 34, i.e. so that the tongue-shaped sections 124, 126 can be spread outward, to subsequently spring back as soon as the collar 40 has been overcome and consequently the projections 128 of the tongues 124, 126 can engage behind the collar 40. The positioning of the connector 100 after it engages behind the collar 40 is shown in FIG. 13.

Subsequently, the first safety 138, which extends along the intermediate wall 140 and secures the first and the second adapter components 112, 114, against an axial movement, is removed (FIG. 14), so that a continued application of an axial force results in an axial displacement of the second adapter component 114. But prior to that it is necessary to overcome the retention force that is generated by the projections 133 and the clamping rib that is also referred to as rib, which connect the inner or second part 132 of the second adapter component 114 with the first inner hollow-cylindrical section 118 of the first adapter component 112.

Figure 15B:
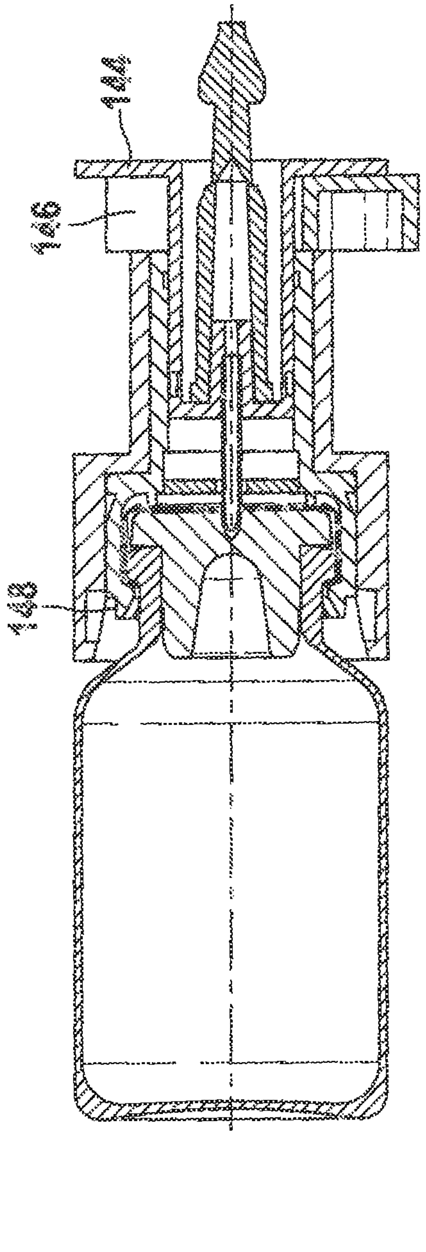

FIG. 15 illustrates the position in which the second outer hollow-cylindrical section 134 encloses the first outer hollow-cylindrical section 116 of the first adapter component 112 to such a degree that bending the tongue-shaped elements 124, 126, also referred to as sections, outward is no longer possible. At the same time, the projection 147, which previously prevented the second adapter component 114 from being pulled back relative to the first adapter component 112, engages behind a recess, configured with a stepped cut-out 148, in the free edge region of the tongue-shaped elements 124, 126, which ensures that pulling back the second adapter component 114, i.e. an axial adjustment against the penetration direction, is no longer possible.

Thus, the second outer hollow-cylindrical section 134 acts on the end side as a clamping ring for the first outer hollow-cylindrical section 116, also to be referred to as bell, of the first adapter component 112, which prevents the tongue-shaped elements 124, 126 to be adjusted radially outward. This creates a closed space prior to the plug being pierced, so that no aerosols being generated by the opening of the vial can reach the surroundings.

The locking provided in this manner is realized so that it can only be released by an additional tool or pull-off forces of for example 300 N. This ensures that the connector 100 remains connected to the vial 20 after use.

Figure 16B:
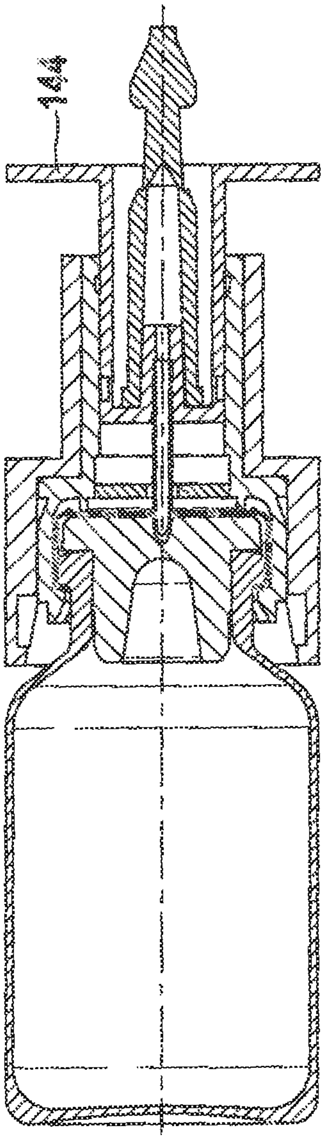
Figure 17B:
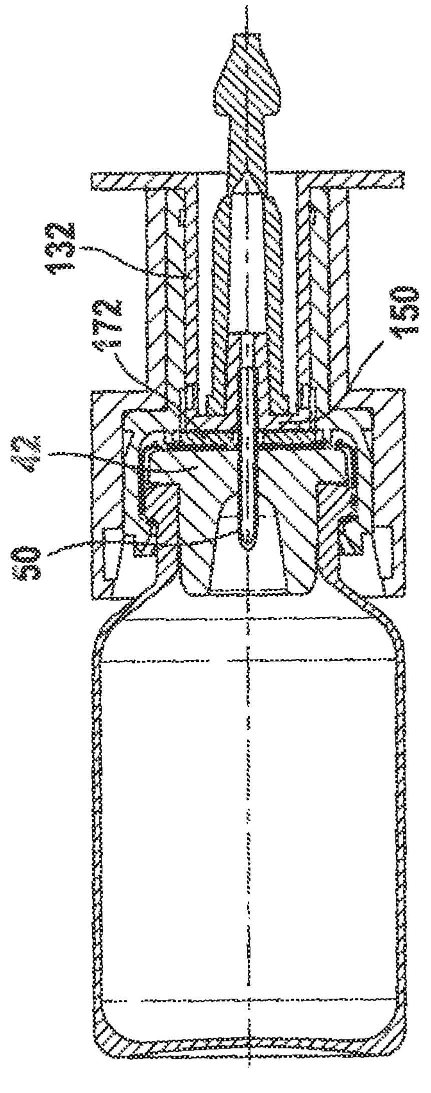
Figure 19:
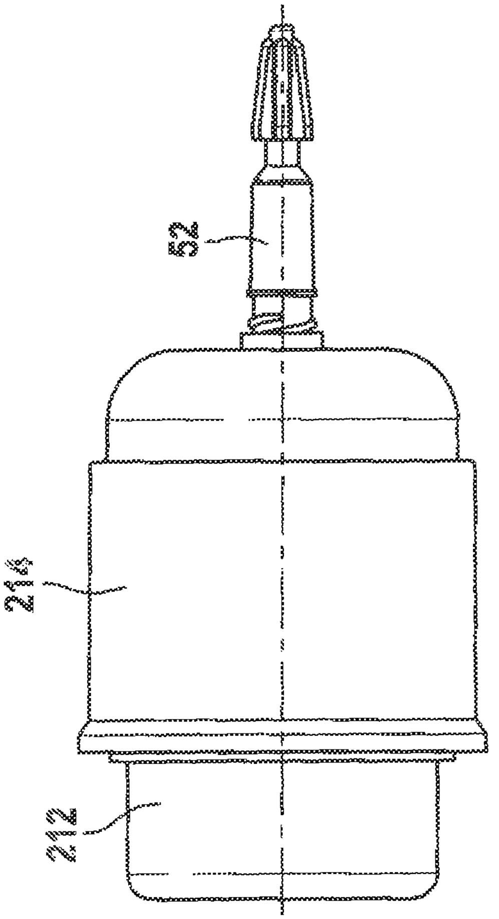

Subsequently the second safety 146 is removed, so that the inner part 132 of the second adapter component 114, which contains the cannula 50, can be moved in the penetration direction by an axial application of force onto the flange-like handle 144 in order to penetrate the plug 42, as a comparison of FIGS. 15 to 17 illustrates. During the final axial adjustment of the inner part 132 of the second adapter component 114, the disk-shaped protective element 172 is pushed through the transverse wall 150, which extends on the inside and through which the cannula 50 passes, of the inner part 132 to come into contact with the outside of the plug 42 or the aluminum cap covering the outside of the plug. In addition, the projection or clamping rib 133 radially protruding from the outer wall of the hollow-cylindrical section of the inner part 132 of the second adapter component 114 snaps into a recess present in the inside wall of the first inner hollow-cylindrical section 118 of the first adapter component 112 or engages behind a step 152, to rule out a withdrawal of the inner part 132 of the second adapter component 114.

After the second adapter component 114 has been properly secured in place, the snap-off connector 52, onto which a bag has been attached prior to this, can be destroyed to carry out the desired mixing process.

FIGS. 18 to 28 show an alternative version of the embodiment of FIGS. 1 to 7, so that the same reference labels are used for identical elements. The illustrations of the transfer device 200 also to be referred to as connector are self-explanatory.

In the transfer device or connector 200 the inseparability of the adapter components is achieved by interlocking an outer or second adapter component 214 with the first adapter component 212 that surrounds the vial 20. This results in the advantage, that when the adapter components 212, 214 have been assembled, they enclose a contained space, in which the perforated closure plug 42 of the vial 20 is located.

The first adapter component 212 possesses a cup-like geometry with a circumferential wall 216 and a bottom wall 218 to accommodate the vial 20. Likewise, in the open edge area of the circumferential wall 216 is provided an annular element 222, from which originate ledge-shaped or tongue-shaped elements extending in the axial direction, which as an example are labelled 228 and 230. As is most evident in FIGS. 20, 21, and 22, the tongue-shaped elements 228, 230 extend inclined relative to the longitudinal axis 232 of the connector 200 and thus of the vial 20, as a result of which the first adapter component 212 and the vial form a rigid unit when the vial 20 has been accepted properly by the first adapter component 212 because then, when the vial 20 is positioned within the first adapter component 212, the tongue shaped elements 228, 230, rest upon the connecting wall 38 that extends between the bottle neck 34 of the vial 20 and its cylindrical body 36. Consequently, the vial 20 can no longer be pulled out of the first adapter component 212.

From the ring element 222, which is joined, such as glued or welded, to the front edge of the cup-shaped first adapter component 212, additionally originate inward protruding further tongue-shaped elements 223, 231, which in accordance with the illustration of FIG. 25 are in contact with the circumferential surface, i.e. the cylindrical body 36 of the vial 20. The tongue-shaped second elements 223, 231, which are longer than the tongue-shaped first elements 228, 230, that serve as safeties, serve as positioning aid for the first adapter component 212, so that the latter surrounds the vial 20 concentrically.

The first adapter component 212 comprises along its circumference latching depressions that are bordered by ridges, as is shown in the sectional view of FIG. 20. As example, two latching depressions have been labelled 310, 312. The projections that border the latching depressions 310, 312 possess a tooth-like geometry of such a nature, that the one of their flanks that is located on the insertion side relative to the second adapter component 214, i.e., the respective upper border in the graphic representation, extend ramp-like in such a manner that it becomes easily possible to push the second adapter component 214 onto the first adapter component 212 or rather push the first adapter component 212 into the second adapter component 214, since projections 322, 324 of tongue-shaped elements 314, 316, 318, 320, which extend in the axial direction of the second adapter component 214, slide along the corresponding flanks. The opposing flanks possess a correspondingly inclined shape, so that when the projections 322, 324 that originate from the tongue-shaped element 314, 316 engage in a latching depression 310, 312, an ordinary application of force is no longer sufficient to pull the adapter components 312, 314 apart.

The axially extending tongue-like elements 314, 316, 318, 320, with the inward facing projections 322, 324 at their ends, originate from an annular element 326, which is fixed in position, e.g. welded, in the opening region of the second adapter component 214. In this area, the second adapter component 214 possesses a bell-shaped geometry, as is most evident in the sectional view of FIG. 20. Accordingly, the annular element 326 possesses a collar-like rim 328 that is bonded, e.g. welded, to the bell-like widening 330 of the second adapter component 214. The tongue-like elements 314, 316, 318, 320 are inclined towards the interior of the second adapter component 214 and are embodied springingly in such a way that it is easily possible to push the first and second adapter components 212, 214 together, but that they can not be pulled apart, as explained above. In this, the interlocking is realized in such a way that it can only be released with an additional tool or with pulling force of at least for example 300 N.

In addition, the interior wall of the cylindrical section of the second adapter component 214 is lined with a sealing element 332, which, when the adapter components 212, 214 have been connected, is in sealing contact with the casing wall 216 of the first adapter component 212. This creates an enclosed space. If the bottom wall 218 of the first adapter component 212 is also closed, the vial 20 is isolated from the surroundings on all sides. This is the preferred configuration.

FIG. 22 further illustrates that the sealing element 332 may possess annular ridges 333 that extend along the circumference.

As above in the embodiment example of FIGS. 1 to 7, concentric with respect to a hollow-cylindrical circumferential wall 244 of the second adapter component 214 that merges into a boundary or bottom wall 245 extends an inner hollow-cylindrical section 268 that at its end side comprises an inward directed preferably circumferential projection 270, which, when the first and the second adapter components 212, 214 are connected, engages behind the collar-like rim 40 of the vial 20, as is clarified for example in the detailed representation of FIG. 21. This provides an additional safety against a separation of the adapter components 212, 214.

In addition, from the casing wall 216 originates an end stop that preferably is embodied as a circumferential ring or ledge 217, and consequently extends radially from the circumferential wall. The free outer edge of the second adapter component 214 is in contact with the end stop when the adapter components 212, 214 have been connected properly and thus the cannula 50 has penetrated the vial 20 to the required degree.

FIGS. 23*a*) to 28*b*) show the connecting of the cannula 50 to the interior of the vial 20 in a self-explanatory manner. FIGS. 23*a*) and *b*) show how the adapter component 212, which surrounds the vial 20, is connected to the second adapter component 214. FIG. 24*a*) and *b*) show the connecting. FIG. 25*a*) and *b*) show a position in which the projections 322, 324, which protrude from the end region of the tongue-like elements 314, 316, 318, 320, already are engaged in a latching recess or depression 310, so that an interlocking has been completed in this position, but the plug 42 has not been entirely pierced.

FIGS. 26*a*) and *b*) represent a position in which the first adapter component 212 has been pushed further into the second adapter component 214. An even deeper engagement is shown in FIGS. 27*a*) and *b*). FIGS. 28*a*) and *b*) illustrate the final position, in which the free edge of the second adapter component 214 is in contact with the annular projection 217 of the first adapter component that serves as end stop. Simultaneously the projection 270, which originates from the edge area of the inner hollow-cylindrical section 268 of the second adapter component 214, is directed inward, and preferably extends circumferentially at least in sections, engages behind the collar-like widening 40 of the vial 20. When the adapter components 212, 214 have been pushed together and the second adapter component 214 is in contact with the end stop formed by the projection 217, the plug 42 has been completely penetrated by the cannula 50.

Naturally the end stop is not an absolutely required feature. An optical display such as a colour mark can also serve to signal to the user that the adapter components 212, 214 have been pushed together to such a degree that the plug 42 has been pierced by the cannula 50 to the required degree.

After the adapter components 212, 214 have been pushed together properly, the snap-off connector 52 originating from the bottom wall 245 of the second adapter component can be removed.

With respect to the latching recesses or depressions 310, 312 and the latching projections 322, 324 it should be noted that according to an alternative configuration a connection between the adapter components 212, 214 can also be realized if the latching recesses 310, 312 are sections of threads into which the projections 322, 324 engage, so that the first adapter component 212 is connected to the second adapter component 214 in a kind of screw connection. However, inseparability is also provided, since in the final state at least the one projection 270 protruding inward from the inner cylindrical section 268 will engage behind the collar-like rim 40 of the vial 20. Naturally it is also possible for several projections or a circumferential projection to be provided.

Figure 20B:
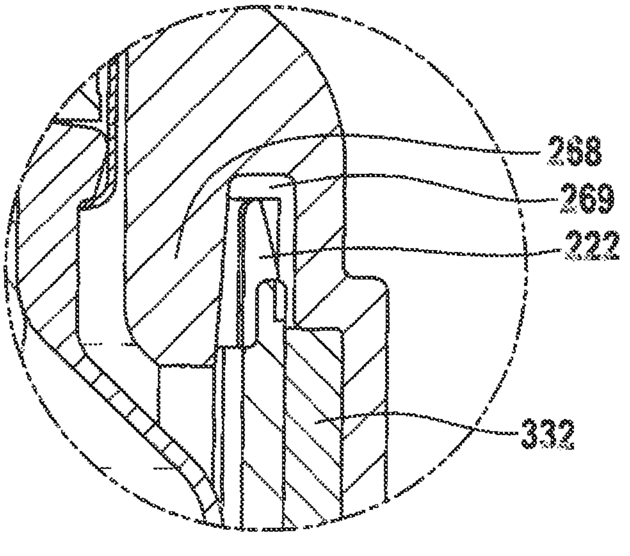

FIGS. 20*a* and 20*b* show an elaboration on the transfer device 200 of FIGS. 28 to 28. Since the structure is the same in principle, the same reference labels are used for identical elements. The embodiment of the transfer device shown in FIGS. 20*a* and 20*b* is different from that of the FIGS. 18 to 28 in that the inward directed projection that engaged behind the collar-like rim 40 of the vial 20 and originated from the inner hollow-cylindrical section 268 is omitted now. Apart from that, the design is the same. The figures in particular also show that when the adapter components 212, 214 have been joined, the circumferential or casing wall 216 of the first adapter component 212 with the annular element 222 extends in the annular gap 269 extending between the inner hollow-cylindrical section 268 and the circumferential wall 244.

Thus the annular gap 269 represents a guidance when the adapter components 212, 214 are being pushed together. Simultaneously a seal is formed between the annular element 222 and the annular gap 269 and consequently between the adapter components 212, 214.

An embodiment of a transfer device to be referred to as connector that is an alternative to that of FIGS. 18 to 28 is shown in FIGS. 29 to 39. Identical elements on principle carry the same reference labels. The transfer device 400 also provides an essential inseparability between a first adapter component 412 that surrounds the vial 20 with the closure plug 42 and a second adapter component 412 with a cap- or cup-like geometry as soon as the first and the second adapter components 412, 414 haven been connected by interlocking. Furthermore, the first and second adapter components 412, 414 surround an enclosed space that encompasses the vial 20, whereby the space is already sealed before the cannula 50 originating from the second adapter component 414 penetrates into the closure plug 42.

Essentially inseparable is to be understood to mean that a disengagement is not possible without tools or without a pulling force of less than 300 N.

The first adapter component 412 possesses a cup-like geometry with a circumferential wall 216 and a bottom wall 218, to accommodate the vial 20. From the circumferential wall 216, also referred to as casing wall, originate latching depressions bordered by ridges, two of which have been marked with the labels 310 and 312 as an example. The projections that border the latching depressions 310, 312 possess a tooth-like geometry of such a nature so that their flanks that extend on the insertion side with respect to the second adapter component 414, i.e. the respective upper borders in the drawings, extend in a ramp-like manner. This facilitates pushing the second adapter component 414 onto the first adapter component 412, or pushing the first adapter component 412 into the second adapter component 414 without problems, as will be explained below. The structure of the latching depressions 310, 312 and the projections that border them are easily discernable in FIG. 32.

In order to prevent a separation of the assembled first and second adapter components 412, 414, i.e. the components being pulled apart against the penetration direction of the cannula 50, the latching depressions 310, 312 interact with radially inward protruding projections 423, 425 of axially extending tongue-shaped elements of the second adapter component 414, some of which are marked by the reference labels 416, 418, 420, 424 as an example. The tongue-shaped elements 416, 418, 420, 424, which with their radially inward protruding projections 423, 425 form latching hooks, originate from an annular element 430 that is firmly bonded with the second or outer adapter component 414, in particular by welding or adhesive bonding. Other methods of attachment are also feasible.

In this, the annular element 430 is fixed in position in the interior area of preferably a bell-shaped widening 432 of the second adapter component 414, as is illustrated in particular in FIG. 31. The tongue-shaped elements 416, 418, 420, 424, which extend from the annular element 430 in the direction of the bottom wall 434 that extends across the longitudinal axis of the adapter component 414, span a circumferential edge, i.e. an envelope, that is adapted to the exterior circumference of the first adapter component 41, so that during the insertion of the first adapter component 412 with the vial 20 into the second or outer adapter component 414 no canting can take place, i.e. a secure axial guidance is provided.

For the purpose of sealing the first adapter component 412 against the second adapter component 414 during the interlocking, a sealing element 436 originates from the inside of the second adapter component 414. The sealing element consists of an inner section 438 that extends in the longitudinal direction of the adapter component 414 and a parallel outer section 446, whereby a gap exists between the sections. The sealing element 436 possesses a cross section with the geometry of a non-isosceles U, with the shorter leg extending on the outside. In the gap extends the edge section 440 of an inner hollow-cylindrical section 444 that extends coaxially to the circumferential wall 442 of the second adapter component 414, as is also clearly shown in FIG. 32. The sealing element 436 is glued to the hollow-cylindrical section 444 or bonded in any other suitable manner or attached such as clamped. In this, the exterior side of the outer section 446 of the sealing element 436 extends flush with respect to the outer surface of the hollow-cylindrical section 444, as is also shown in FIG. 32. When the first and the second adapter components 412, 414 are being pushed together, the outer section 446 of the sealing element 436 slides along the inner side of the circumferential wall 216 of the first adapter component 412 and thus seals the outer adapter component 414 against the first or inner adapter component 412.

As is shown in FIG. 39, the inner surface of the inner section 438 of the sealing element 436 comprises longitudinal ribs 439 that serve to guide the vial 20. Furthermore, the inner section 438 on its inside extends obliquely, starting from its rim (line 441), as is shown in FIG. 32. This also provides guidance for the vial 20. Simultaneously a seal is provided against the vial 20, as is illustrated in FIG. 32. Furthermore, projections 447 are present at the outside of the outer section 446 of the sealing element 436, which provides a seal between the first adapter component 412 and the second adapter component 414 in the area of the latching depressions 310, 312. This ensures sealing between the first and the second adapter components 412, 414. As mentioned before, the sealing element also is in contact with the vial 20, or rather the latter's obliquely extending neck section (connecting wall 38).

In the interaction of the latching projections 423, 425 of the tongue-shaped latching elements 416, 418, 420, 424 with the latching depressions 310, 312, their respective geometries ensure that after the latching projections 423, 425 have engaged in one of the depressions 310, 312 it is no longer possible to pull the adapter components 412, 414 apart, rather that before the plug 42 has been penetrated, only a pushing together in the penetration direction is possible. This creates a sealed space prior to the piercing of the plug, so that no aerosols created during the opening of the vial can escape to the surroundings.

Penetration is achieved by continued pushing together to such an extent that the cannula 50 is pushed through the plug 42, whereby the cannula 50 penetrates through the plug 42 completely. In this, a pushing together of the adapter components 412, 414 is possible until the lower edge of the second adapter component 414, or rather the annular element 430 extending in this area, comes into contact with a radially circumferential ledge 217, which protrudes from the circumferential wall 216 of the first adapter component 412, as is also the case in connection with the embodiment example of FIGS. 18 to 28.

The interaction between the first and the second adapter components 412, 414 up to the time when the cannula 50 has completely penetrated the closure plug 42 is shown in a self-explanatory fashion in FIGS. 33 to 38.

Figure 33B:
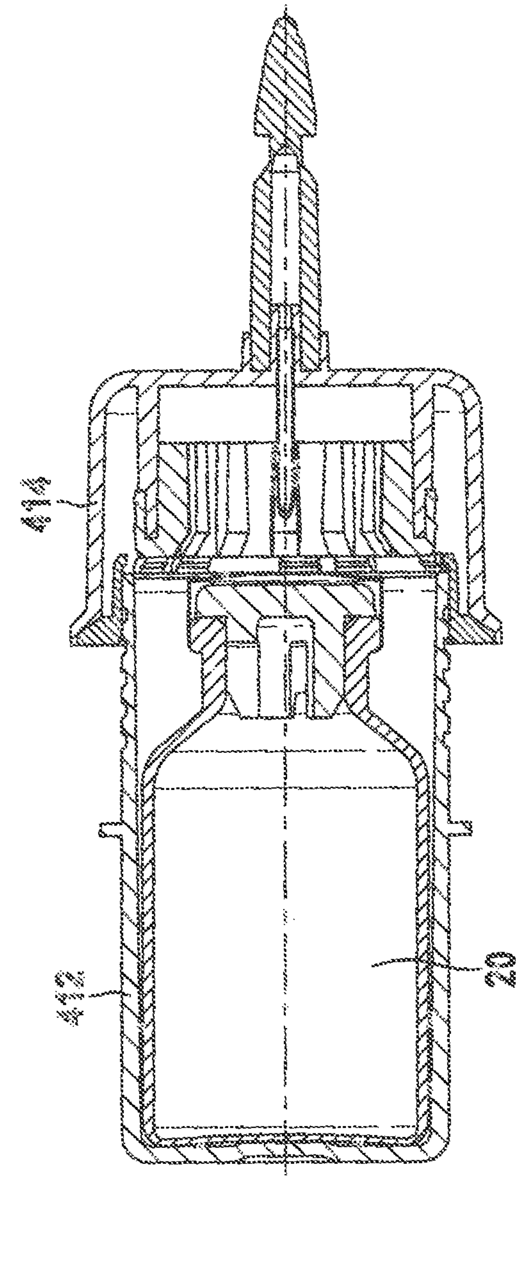

FIG. 33 illustrates how the upper or second adapter component 414 is placed onto the lower or inner or first adapter component 412, after the vial 20 has been inserted into the lower adapter component 412.

Figure 34B:
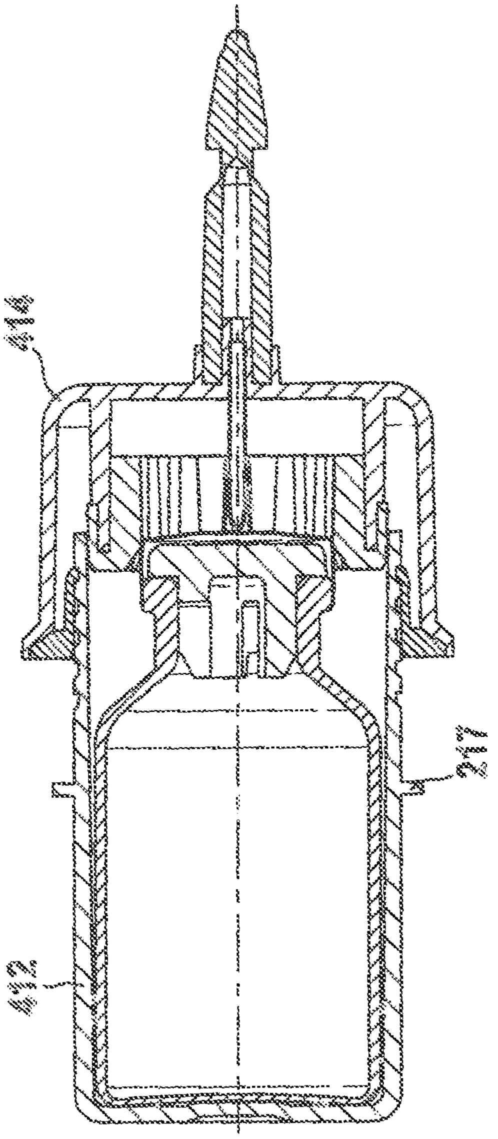

FIG. 34. shows that the lower adapter component 412 has been pushed into the outer adapter component 414 to such an extent that the cannula does not yet penetrate the closure plug 42. However, irrespective hereof, the latching hooks formed by the projections 423, 425 that protrude radially inward from the tongue-shaped elements 416, 418, 420, 424 already engage in the first latching depressions 310.

Figure 38B:
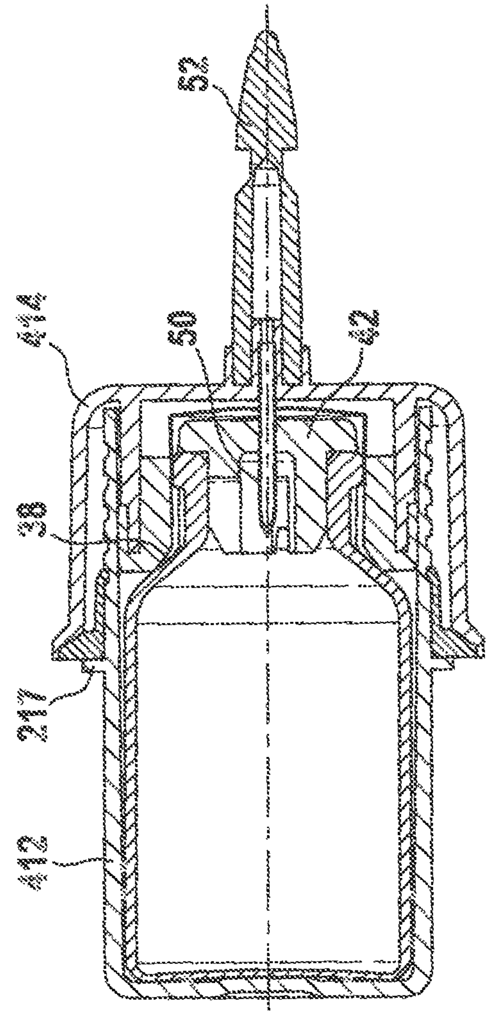

The further figures illustrate the continued pushing together of the adapter components 412, 414, whereby in FIG. 38 the first adapter component 412 has been pushed into the outer adapter component 414 to such an extent that the latter is in contact with the circumferential end stop 217, i.e. no further pushing together is possible. In this position, the cannula 50 has pushed through the closure plug 42 to the necessary extent. Subsequently, the connector 52 can be snapped off, in order to initiate the mixing process, e.g. via the tube of a solvent bag. Naturally, the end-stop 217 is not absolutely required. Rather, an optical marker, such as a circumferential ring, can also be used to signal to the user that the adapter components 412, 414 have been pushed into each other to the necessary extent and that the cannula 50 has pierced the plug 42 to a sufficient degree.

But we also have to emphasize another configuration of the embodiments shown in FIGS. 29 to 39. It is also possible for the first or inner adapter component 412, for example in the delivered state without a vial attached, to be attached to the second or outer adapter component 414 in such a manner that the bottom side of the first adapter component 412 has been pushed into the outer or second adapter component 414, which ensures that the tip of the cannula 50 can not be touched. The insertion is limited by the latching hooks, i.e. by the latching elements 416, 418, 420, 424 with their latching projections 423, 425. This ensures that the cannula 50 can not penetrate into the base of the first adapter component 412. In this, the latching hooks have different lengths, so that the bottom of the adapter component 412 rests upon the shorter hooks.

| | |
|---|---|
| 10 | Connector/transfer device |
| 12 | First adapter component |
| 14 | Second adapter component |
| 16 | Circumferential wall/Casing wall |
| 17, 19 | Ribs |
| 18 | Bottom wall or section |
| 20 | Vial/Small bottle |
| 22 | Holding element/Annular element/section |
| 24 | Projections |
| 26 | Projections |
| 28 | Element/Position-securing element |
| 30 | Element/Position-securing element |
| 32 | Longitudinal axis |
| 34 | Bottle neck |
| 36 | Cylindrical body |
| 38 | Connecting wall/transition |
| 40 | Collar |
| 42 | Plug/closure plug |
| 44 | Hollow-cylindrical section |
| 46 | Wall/boundary wall |
| 48 | Extension |
| 50 | Penetration needle/cannula |
| 52 | Snap-off connector |
| 54 | Inner wall |
| 56 | Depression/guide |
| 58 | Depression/guide |
| 60 | Section |
| 62 | Section |
| 64 | Projection |
| 66 | Projection |
| 68 | Inner hollow-cylindrical section |
| 70 | Front edge |
| 72 | Protective element |
| 74 | Cannula tip/tip |
| 76 | Step |
| 78 | Edge/corner |
| 80 | End section |
| 100 | Connector/transfer device |
| 112 | First adapter component |
| 114 | Second adapter component |
| 116 | Outer hollow-cylindrical section |
| 118 | Inner hollow-cylindrical section |
| 120 | Intermediate wall |
| 122 | Slots |
| 124 | Tongue-shaped section/element |
| 126 | Tongue-shaped section/element |
| 128 | Projection |
| 130 | Outer adapter component |
| 132 | Inner hollow-cylindrical section |
| 133 | Rib/Projection/Clamping rib |
| 134 | Second outer hollow-cylindrical section |
| 136 | Third outer hollow-cylindrical section |
| 138 | First safety |
| 140 | Intermediate wall |
| 147 | Projection/Clamping rib |
| 150 | Transverse wall |
| 152 | Step |
| 142 | Front edge |
| 144 | Section |
| 146 | Safety |
| 148 | Cut-out |

-continued

| | |
|---|---|
| 153 | Recess |
| 172 | Protective element |
| 200 | Connector/transfer device |
| 212 | Adapter component |
| 214 | Adapter component |
| 216 | Casing wall |
| 217 | Ledge/projection |
| 218 | Bottom wall/section |
| 222 | Annular element/section |
| 223 | Tongue-shaped element |
| 228 | Element/position-securing element |
| 230 | Element/position-securing element |
| 231 | Further tongue-shaped element |
| 244 | Circumferential wall |
| 245 | Boundary/bottom wall |
| 268 | Inner hollow-cylindrical section |
| 269 | Annular gap |
| 270 | Projection |
| 310 | Latching depression/recess |
| 312 | Latching depression/recess |
| 314 | Element |
| 316 | Element |
| 318 | Element |
| 320 | Element |
| 322 | Projection |
| 324 | Projection |
| 326 | Annular element |
| 328 | Edge |
| 330 | Widening |
| 332 | Sealing element |
| 333 | Annular ridges |
| 400 | Connector/transfer device |
| 412 | Adapter component |
| 414 | Adapter component |
| 416 | Tongue-shaped element |
| 418 | Tongue-shaped element |
| 420 | Tongue-shaped element |
| 423 | Projection |
| 424 | Tongue-shaped element |
| 425 | Projection |
| 430 | Annular element |
| 432 | Widening |
| 434 | Bottom wall |
| 436 | Sealing element |
| 438 | Inner section |
| 439 | Longitudinal ribs |
| 440 | Edge section |
| 441 | Line |
| 442 | Circumferential wall |
| 444 | Hollow-cylindrical section |
| 446 | Outer section |
| 447 | Projections |

What is claimed is:

1. A transfer device for transferring a medium out of, or into, a bottle having a cylindrical body and a neck that is sealable by a closure, comprising:

a first adapter component configured to be positioned on the bottle, and a second adapter component interacting with the first adapter component, and moveable in a longitudinal direction of the bottle, wherein the second adapter component comprises a delivery element for piercing the closure, wherein, after moving the second adapter component along the first adapter component in the direction towards the closure and locking the second adapter component, the first adapter component is non-detachably secured in position at the bottle, or around the bottle, and wherein the first adapter component comprises:

a casing wall surrounding the bottle along a circumference of the casing wall, the first adapter component having a hollow-cylindrical geometry with a front edge extending on a side of the bottle having the closure, a bottom section covering a base of the bottle, at least in sections, a ring element connected to a front edge of the first adapter component, first tongue-shaped elements extending from the ring element, in a direction of, and inclined relative to, a longitudinal axis of the first adapter component, and second tongue-shaped elements extending inwardly from the ring element, wherein, when the bottle is positioned in the first adapter component:

the first tongue-shaped elements rest on, or are configured to rest on the bottle, or at a transition between the neck of the bottle and the circumferential wall of the bottle, and prevent the bottle from being pulled out of the first adapter component, and the second tongue-shaped elements contact the cylindrical body of the bottle, and position the first adapter component concentrically around the bottle.

2. The transfer device according to claim 1, wherein, when the transfer device is secured in position at or around the bottle, the first and the second adapter components form a surrounding sealed envelope that surrounds the bottle, at least in the area of the closure.

3. The transfer device according to claim 1, wherein the interior cross-section of the hollow-cylindrical section of the second adapter component corresponds to the exterior cross-section of the casing wall so as to guide the first adapter component during an axial displacement of the second adapter component.

4. The transfer device according to claim 1, wherein the second adapter component is in a position that surrounds the first adapter component, and wherein the second adapter component is sealed with respect to the first adapter component.

5. The transfer device according to claim 4, wherein the second adapter component, or the hollow-cylindrical section of the second adapter component, comprise a sealing element.

6. The transfer device according to claim 1, wherein at least one first latching element originates from the second adapter component, wherein the at least one first latching element comprises an axially extending bendable tongue element with a latching projection at an end side of the latching projection, with the latching projection extending in the direction of the longitudinal axis of the second adapter component, or of the transfer device, and further, the latching projections engage in latching depressions bordered by tooth-like projections of the first adapter component.

7. The transfer device according to claim 1, wherein a circumferential annular projection protrudes from the casing wall of the first adapter component, and contacts the second adapter component, when the first and the second adapter components are connected.

8. The transfer device according to claim 1, wherein, when the first and the second adapter components have been at least partially pushed into each other, they form a sealed container that surrounds the bottle.

9. The transfer device according to claim 1, wherein an end of an inner hollow-cylindrical section of the second adapter component comprises at least one inward directed projection, which, when the first and the second adapter components are connected, engages behind a collar-like rim of the bottle.

10. The transfer device according to claim 1, wherein, when the first and the second adapter components have been pushed into each other, they are inseparably connected during regular use.

11. The transfer device according to claim 1, wherein, during an adjustment of the second adapter component in a penetrating direction of the delivery element, the first adapter component interacts with the second adapter component in such a manner that an adjustment of the second adapter component relative to the first adapter component against the penetration direction is prevented.

12. The transfer device according to claim 1, wherein the second adapter component possesses a hood- or cup-shaped geometry with a cylindrical circumferential wall and, extending coaxial to the latter, an inner hollow-cylindrical section, from which originates a sealing element which, when the first and the second adapter components have been assembled, seals the second adapter component against the first adapter component.

13. The transfer device according to claim 5, wherein the sealing element possesses a U-shaped geometry with a non-isosceles cross-section, with an inner and an outer leg, in between which extends, in sections, the inner hollow-cylindrical section.

14. The transfer device according to claim 6, wherein the axially extending bendable tongue element spans a cylindrical envelope that extends coaxially relative to the circumferential wall of the second adapter component, and, starting from the annular element, extends in the direction of the bottom wall of the second adapter component.

15. The transfer device according to claim 5, wherein the sealing element has a hollow-cylindrical geometry.

16. The transfer device according to claim 5, wherein the sealing element is embodied as an insert.

17. The transfer device according to claim 7, wherein the circumferential annular projection is a limit stop.

18. The transfer device according to claim 1, wherein the first tongue-shaped elements extend into a space between the first adapter component and the bottle.

19. The transfer device according to claim 1, wherein the second tongue-shaped elements are longer than the first tongue-shaped elements, and wherein the second tongue-shaped elements contact and surround the bottle inside the first adapter component.

20. The transfer device according to claim 1, wherein the second tongue-shaped elements concentrically surround the bottle.

* * * * *